United States Patent
Hagimori et al.

(10) Patent No.: US 6,754,446 B2
(45) Date of Patent: Jun. 22, 2004

(54) IMAGING DEVICE AND DIGITAL CAMERA USING THE IMAGING DEVICE

(75) Inventors: Hitoshi Hagimori, Ikoma-Gun (JP); Yasushi Yamamoto, Shanghai (CN); Genta Yagyu, Amagasaki (JP); Kazuhiko Ishimaru, Kaizuka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/325,271

(22) Filed: Dec. 20, 2002

(65) Prior Publication Data

US 2003/0161620 A1 Aug. 28, 2003

(30) Foreign Application Priority Data

Jan. 8, 2002 (JP) ........................................ 2002-001854

(51) Int. Cl.[7] .............................. G03B 5/00; G02B 15/14
(52) U.S. Cl. ....................... 396/72; 396/351; 348/240.3; 359/676; 359/678; 359/687; 359/764; 359/774
(58) Field of Search ................................ 359/676, 678, 359/687, 764, 774; 396/72, 351; 348/240.3

(56) References Cited

U.S. PATENT DOCUMENTS

| 4,037,238 A | * | 7/1977 | Leitz et al. ................. 396/351 |
| 5,448,319 A | | 9/1995 | Uzawa ......................... 354/81 |
| 6,002,526 A | * | 12/1999 | Okada et al. ................ 359/677 |
| 6,104,432 A | | 8/2000 | Nakamura et al. .......... 348/360 |

FOREIGN PATENT DOCUMENTS

| EP | 0 906 587 B1 | 4/1999 |
| JP | H08-248318 A | 9/1996 |
| JP | 11-196303 A | 7/1999 |
| JP | 11-258678 A | 9/1999 |
| JP | 2000-131610 A | 5/2000 |

* cited by examiner

*Primary Examiner*—W. B. Perkey
(74) *Attorney, Agent, or Firm*—Sidley Austin Brown & Wood LLP

(57) ABSTRACT

An imaging device has a zoom lens system comprising a plurality of lens units and forming an optical image of an object so as to be continuously and optically zoomable by varying a distance between the lens units; and an image sensing element converting the optical image formed by the zoom lens system into an electric signal, wherein the zoom lens system comprises from the object side: a first lens unit having positive optical power as a whole and including a reflecting surface that bends a luminous flux substantially 90 degrees; a second lens unit having negative optical power and disposed with a variable air space from the first lens unit; a third lens unit having positive optical power and disposed with a variable air space from the second lens unit; a fourth lens unit having positive optical power and disposed with a variable air space from the third lens unit; and a fifth lens unit disposed with a variable air space from the fourth lens unit, and wherein zooming is optically performed by varying the air spaces between the lens units.

30 Claims, 14 Drawing Sheets

Fig. 9A FNO=2.89
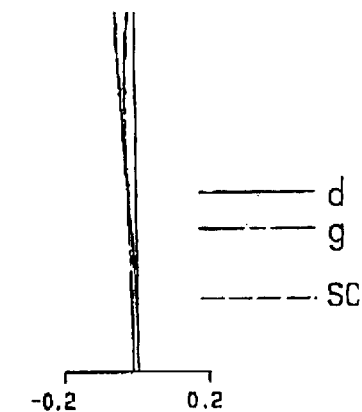
Spherical Aberration,
Sine Condition
Fig. 9B Y'=3.3
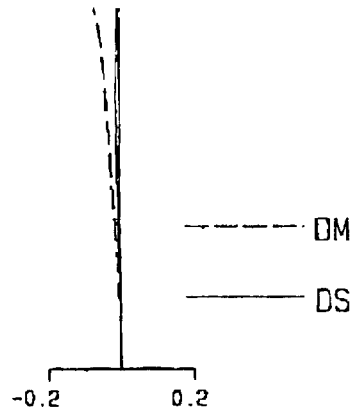
Astigmatism
Fig. 9C Y'=3.3
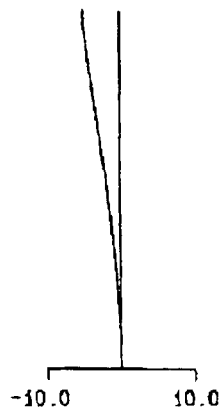
Distortion %
Fig. 9D FNO=3.38
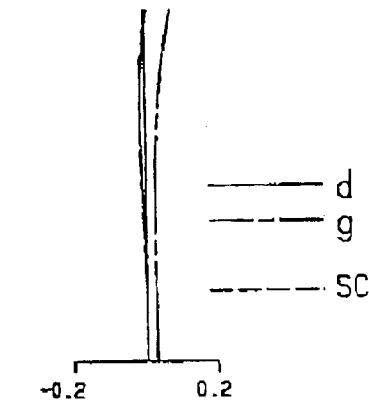
Spherical Aberration,
Sine Condition
Fig. 9E Y'=3.3
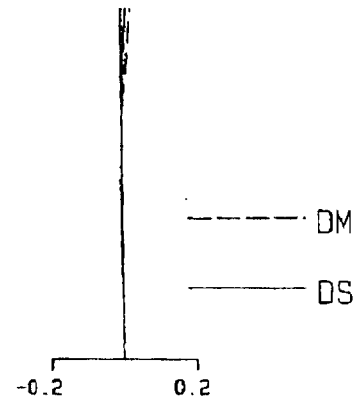
Astigmatism
Fig. 9F Y'=3.3
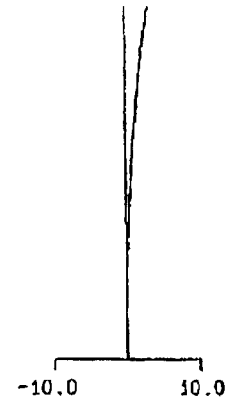
Distortion %
Fig. 9G FNO=3.60
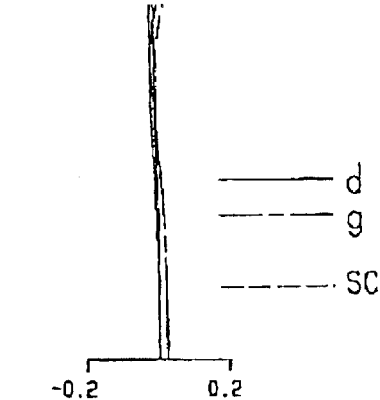
Spherical Aberration,
Sine Condition
Fig. 9H Y'=3.3
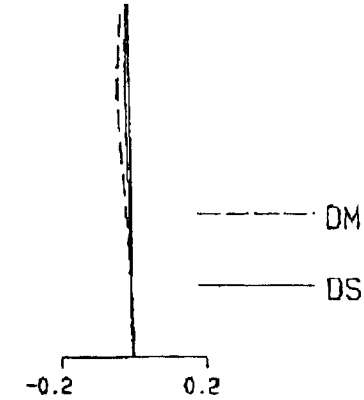
Astigmatism
Fig. 9I Y'=3.3
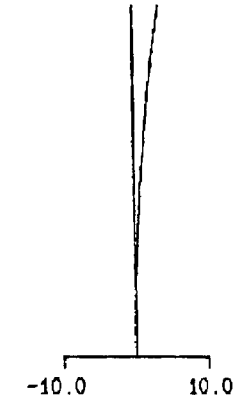
Distortion %

Fig.10A FNO=2.81
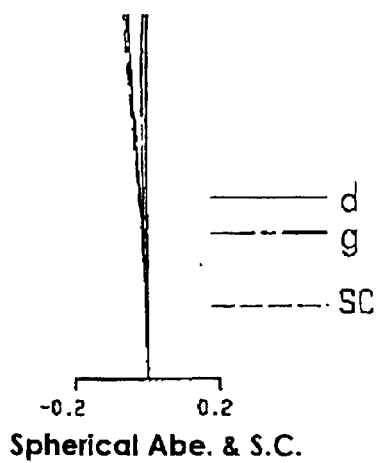
Spherical Abe. & S.C.
Fig.10B Y'=3.3
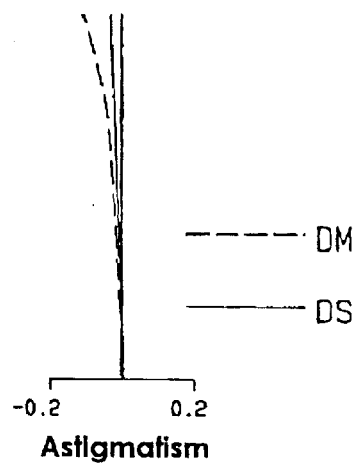
Astigmatism
Fig.10C Y'=3.3
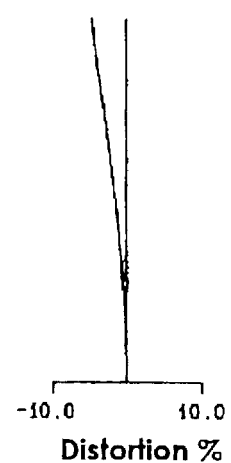
Distortion %
Fig.10D FNO=3.19
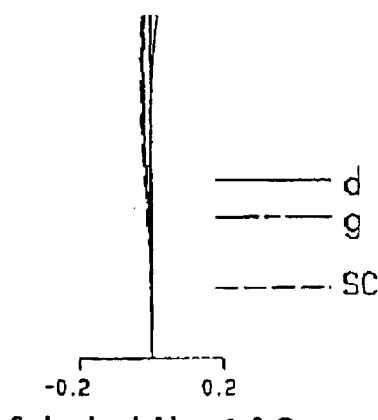
Spherical Abe. & S.C.
Fig.10E Y'=3.3
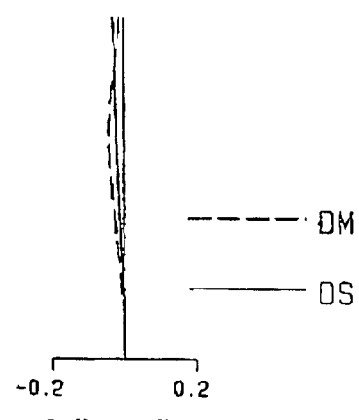
Astigmatism
Fig.10F Y'=3.3
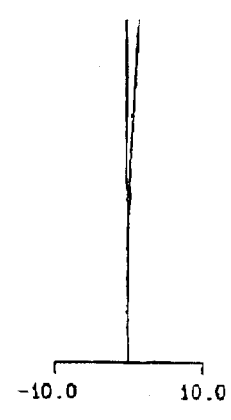
Distortion %
Fig.10G FNO=3.60
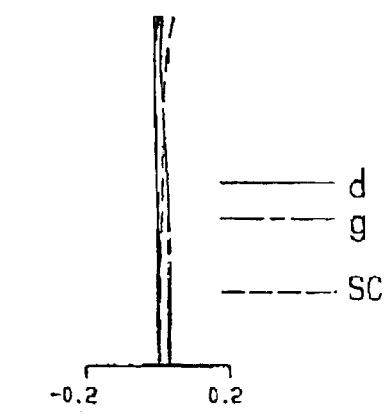
Spherical Abe. & S.C.
Fig.10H Y'=3.3
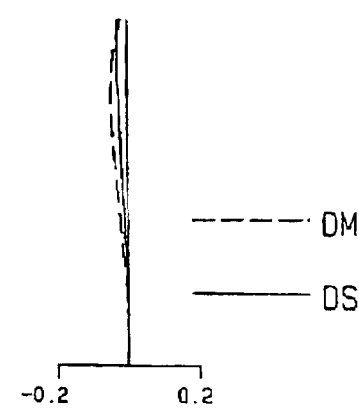
Astigmatism
Fig.10I Y'=3.3
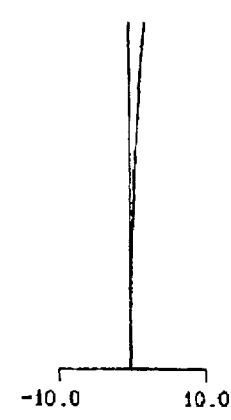
Distortion %

Fig.11A FNO=2.94 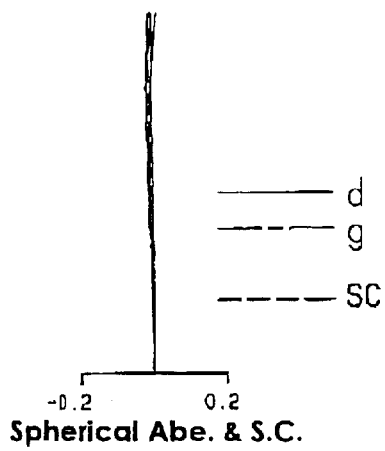
Spherical Abe. & S.C.
Fig.11B Y'=3.3 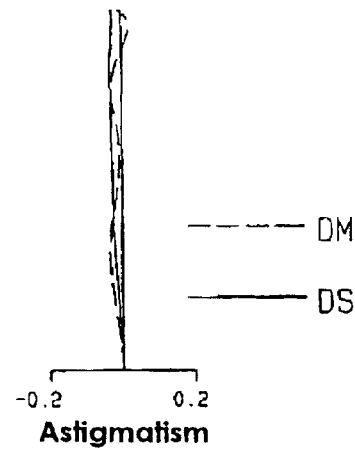
Astigmatism
Fig.11C Y'=3.3 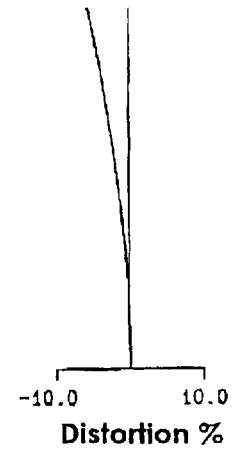
Distortion %
Fig.11D FNO=3.25 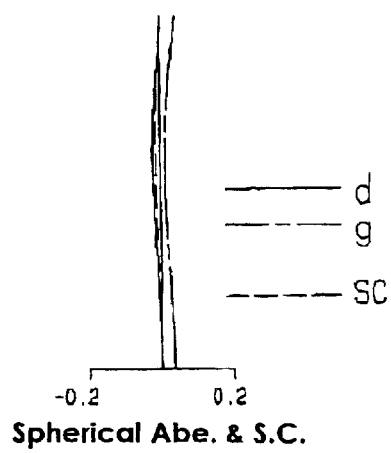
Spherical Abe. & S.C.
Fig.11E Y'=3.3 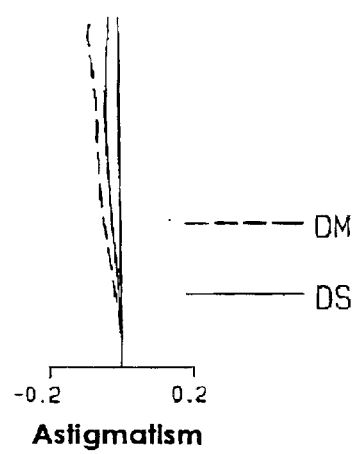
Astigmatism
Fig.11F Y'=3.3 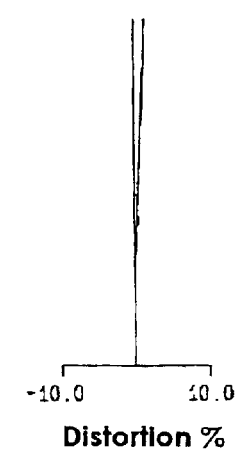
Distortion %
Fig.11G FNO=3.80 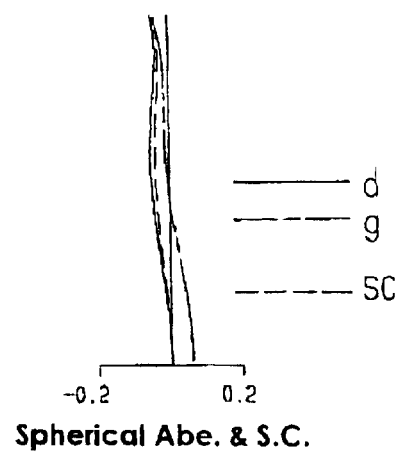
Spherical Abe. & S.C.
Fig.11H Y'=3.3 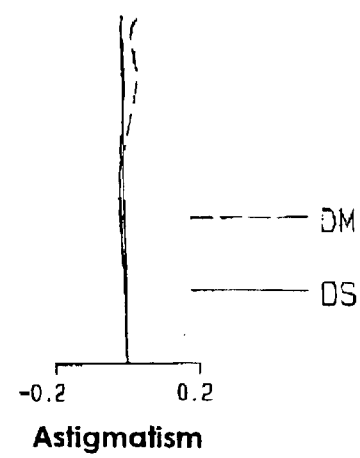
Astigmatism
Fig.11I Y'=3.3 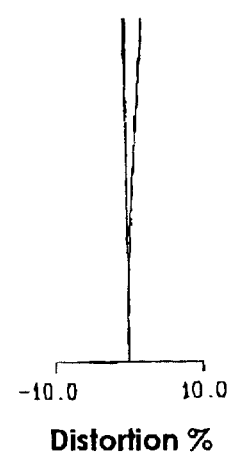
Distortion %

Fig.12A FNO=2.73
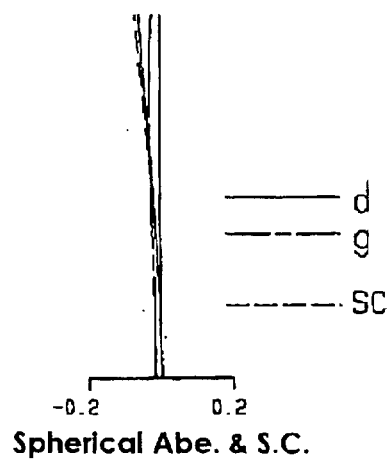
Spherical Abe. & S.C.
Fig.12B Y'=3.3
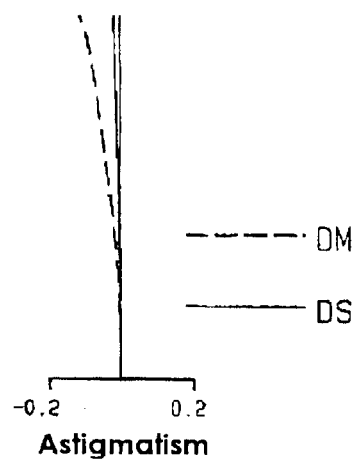
Astigmatism
Fig.12C Y'=3.3
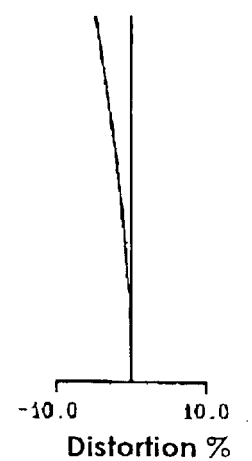
Distortion %
Fig.12D FNO=3.13
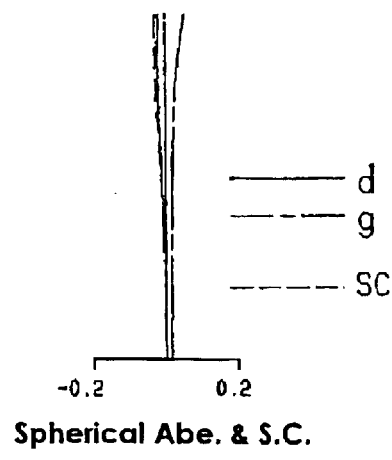
Spherical Abe. & S.C.
Fig.12E Y'=3.3
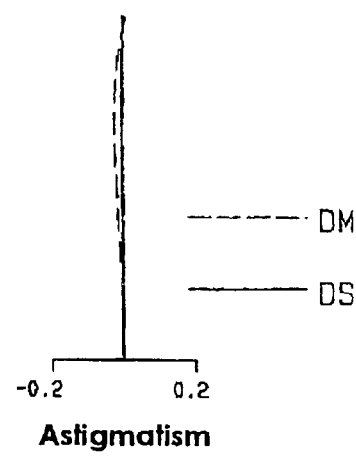
Astigmatism
Fig.12F Y'=3.3
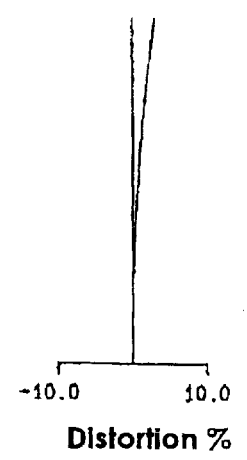
Distortion %
Fig.12G FNO=3.60
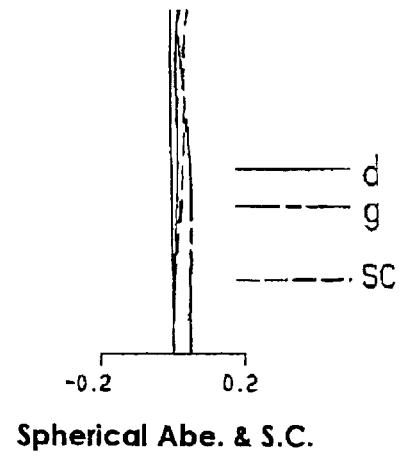
Spherical Abe. & S.C.
Fig.12H Y'=3.3
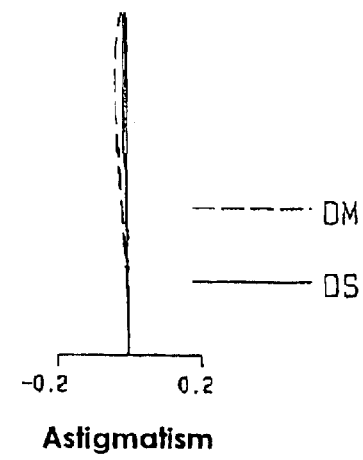
Astigmatism
Fig.12I Y'=3.3
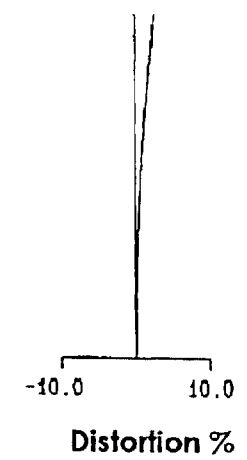
Distortion %

Fig.13A FNO=2.88
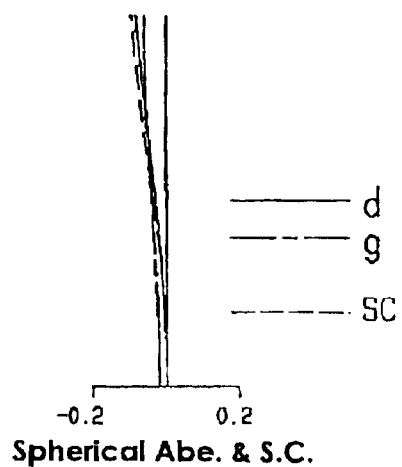
Spherical Abe. & S.C.
Fig.13B Y'=3.3
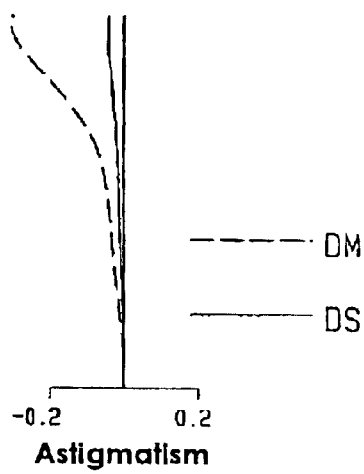
Astigmatism
Fig.13C Y'=3.3
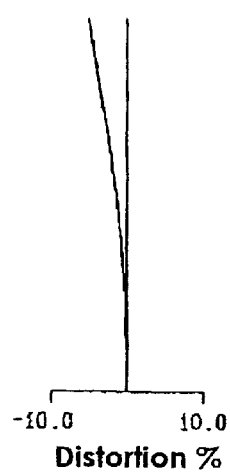
Distortion %
Fig.13D FNO=3.22
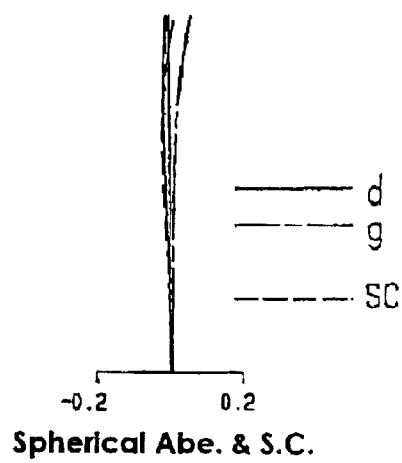
Spherical Abe. & S.C.
Fig.13E Y'=3.3
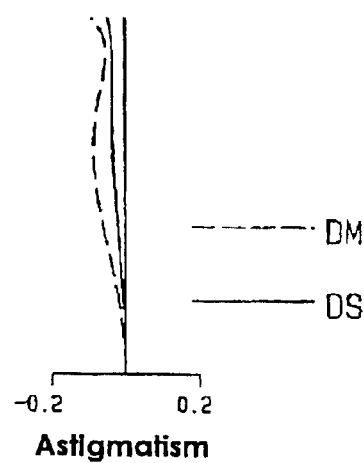
Astigmatism
Fig.13F Y'=3.3
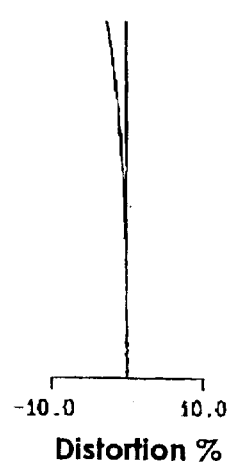
Distortion %
Fig.13G FNO=3.60
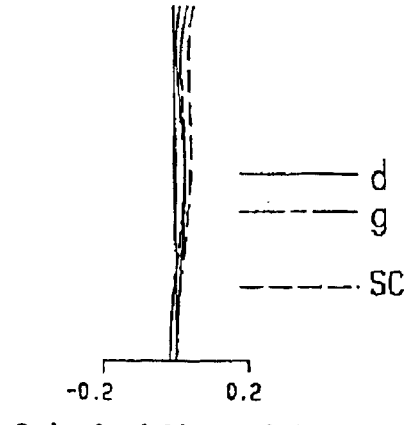
Spherical Abe. & S.C.
Fig.13H Y'=3.3
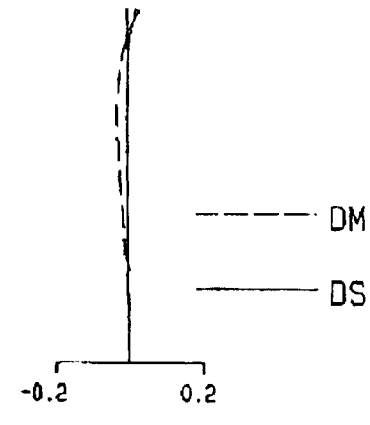
Astigmatism
Fig.13I Y'=3.3
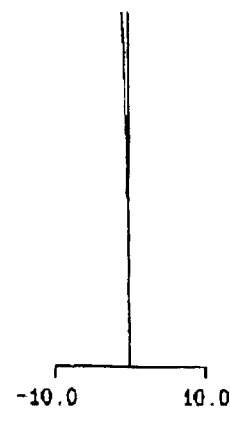
Distortion %

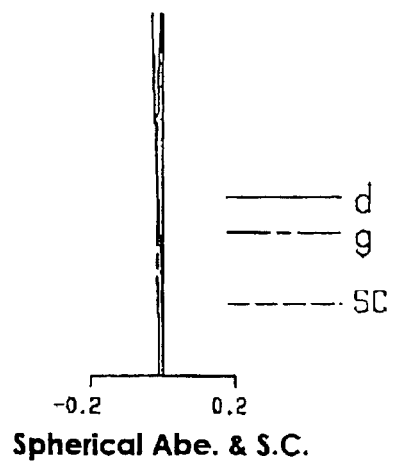
Fig.14A FNO=2.85
Spherical Abe. & S.C.
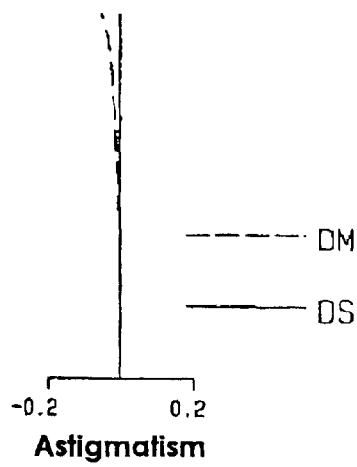
Fig.14B Y'=3.3
Astigmatism
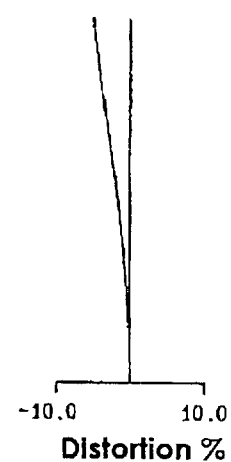
Fig.14C Y'=3.3
Distortion %
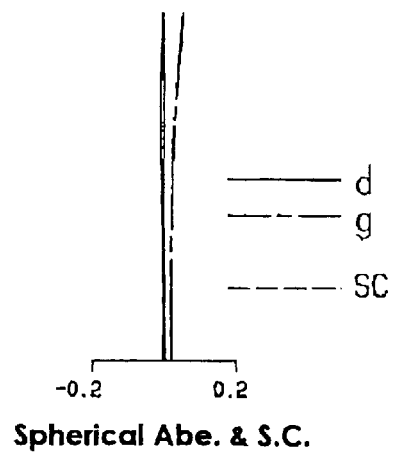
Fig.14D FNO=3.31
Spherical Abe. & S.C.
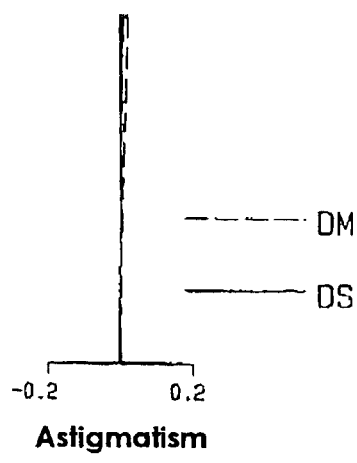
Fig.14E Y'=3.3
Astigmatism
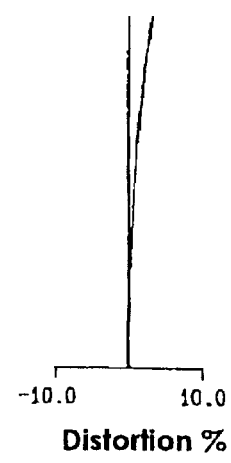
Fig.14F Y'=3.3
Distortion %
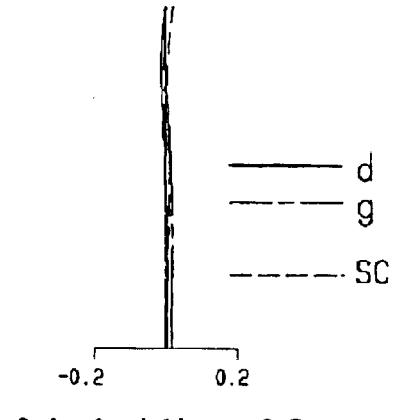
Fig.14G FNO=3.60
Spherical Abe. & S.C.
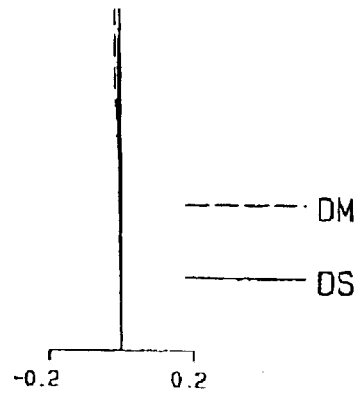
Fig.14H Y'=3.3
Astigmatism
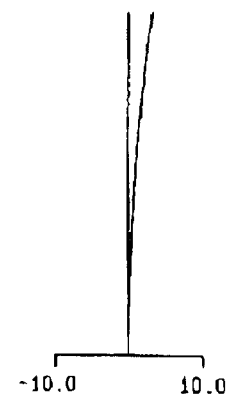
Fig.14I Y'=3.3
Distortion %

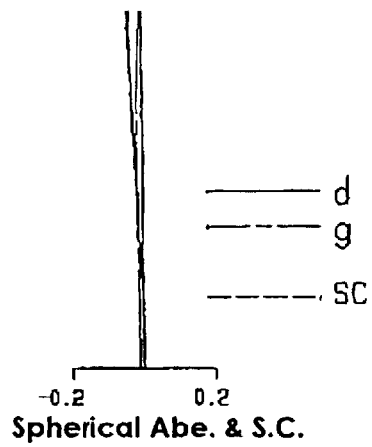
Fig. 15A FNO=2.90
Spherical Abe. & S.C.
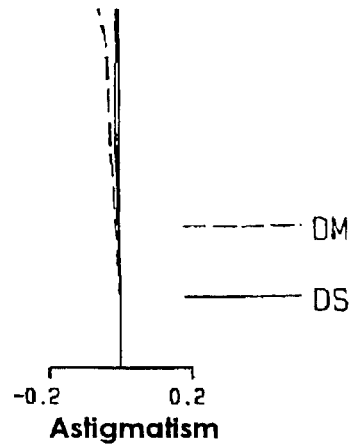
Fig.15B Y'=3.3
Astigmatism
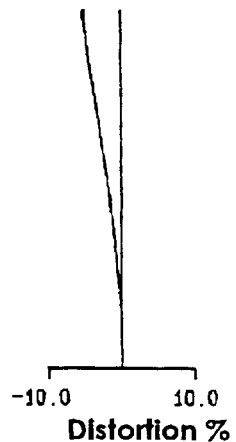
Fig.15C Y'=3.3
Distortion %
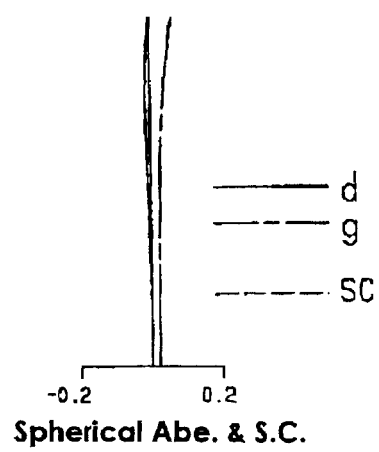
Fig.15D FNO=3.35
Spherical Abe. & S.C.
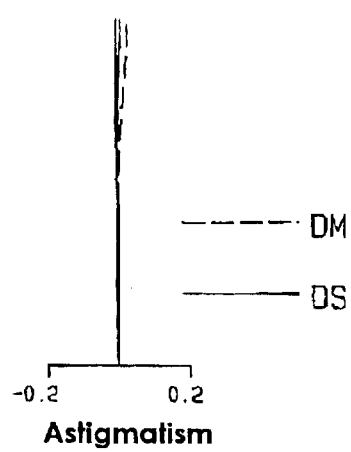
Fig.15E Y'=3.3
Astigmatism
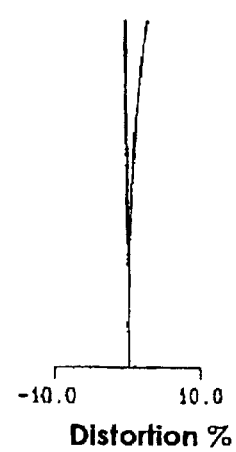
Fig.15F Y'=3.3
Distortion %
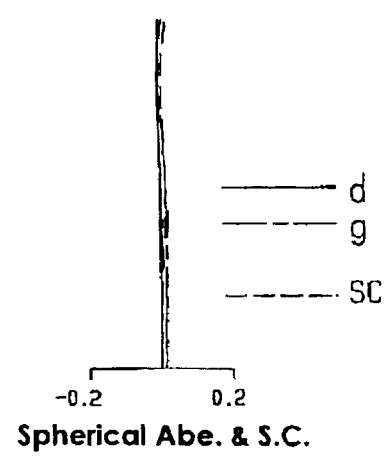
Fig.15G FNO=3.60
Spherical Abe. & S.C.
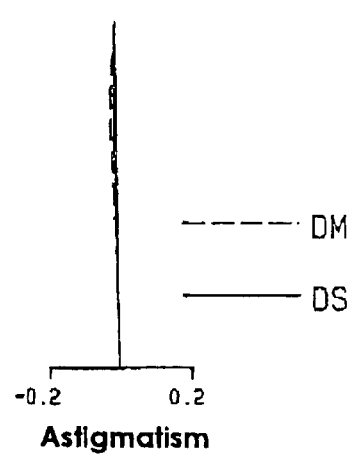
Fig.15H Y'=3.3
Astigmatism
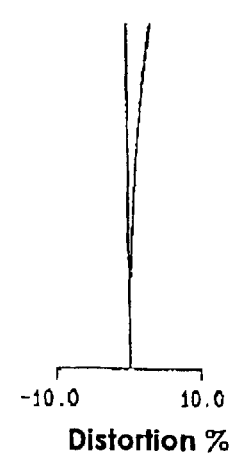
Fig.15I Y'=3.3
Distortion %

Fig.16A  FNO=2.57
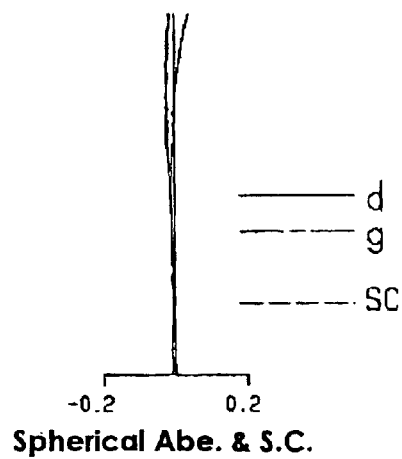
Spherical Abe. & S.C.
Fig.16B  Y'=3.3
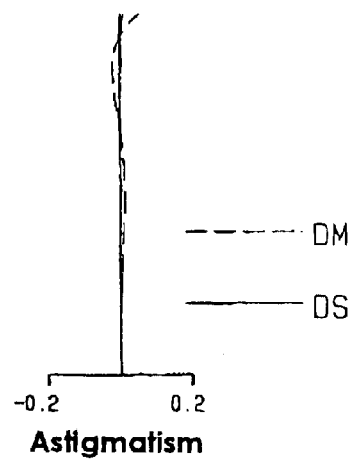
Astigmatism
Fig.16C  Y'=3.3
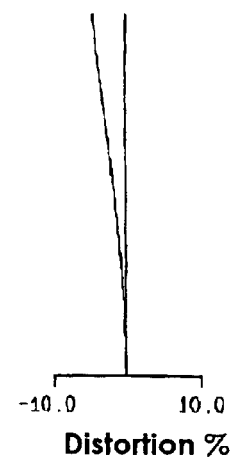
Distortion %
Fig.16D  FNO=3.38
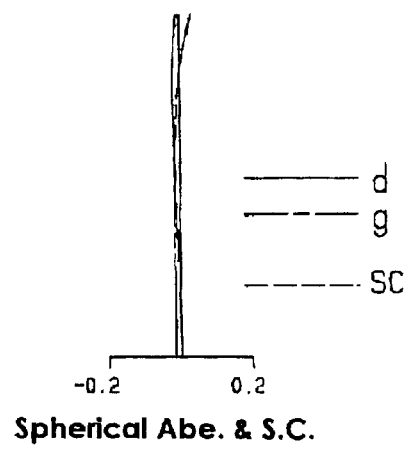
Spherical Abe. & S.C.
Fig.16E  Y'=3.3
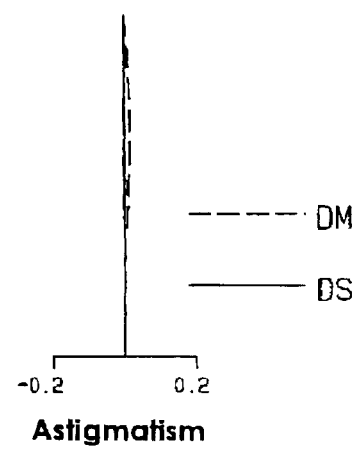
Astigmatism
Fig.16F  Y'=3.3
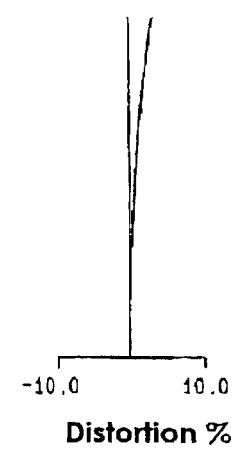
Distortion %
Fig.16G  FNO=3.60
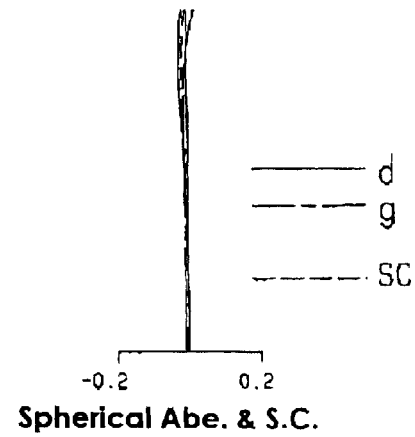
Spherical Abe. & S.C.
Fig.16H  Y'=3.3
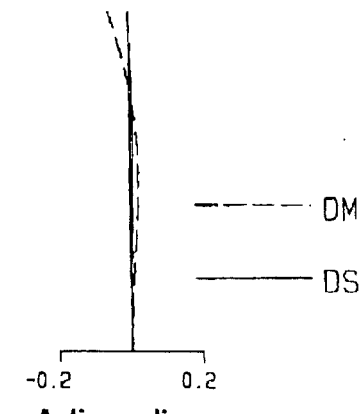
Astigmatism
Fig.16I  Y'=3.3
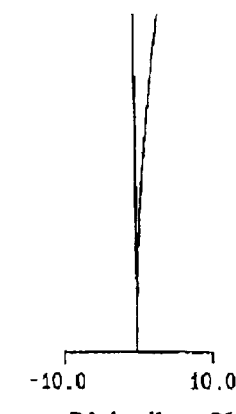
Distortion %

IMAGING DEVICE AND DIGITAL CAMERA USING THE IMAGING DEVICE

RELATED APPLICATIONS

This application is based on application Ser. No. 2002-1854 filed in Japan, the content of which is hereby incorporated by reference.

1. Field of the Invention

The present invention relates to an imaging device having an image sensing element that converts into an electric signal an optical image formed on the light receiving surface of a CCD (charge coupled device), a CMOS (complementary metal-oxide semiconductor) sensor or the like, and more particularly, to an imaging device which is a principal component of a digital camera and a camera incorporated in or externally attached to a personal computer, a mobile computer, a mobile telephone, a PDA (personal digital assistance) or the like. More specifically, the present invention relates to a small-size imaging device having a zoom lens system.

2. Description of the Prior Art

In recent years, digital cameras have rapidly been becoming widespread that convert an optical image into an electric signal by using an image sensing element such as a CCD or a CMOS sensor instead of silver halide film, convert the data to digital form, and record or transfer the digital data. In such digital cameras, since CCDs and CMOS sensors having a large number of pixels such as two million or three million pixels have come to be comparatively inexpensively provided, demand for a high-performance imaging device equipped with an image sensing element has significantly increased, and particularly, a compact imaging device provided with a zoom lens system capable of performing zooming without any image degradation are earnestly desired.

Further, in recent years, imaging devices have come to be incorporated in or externally attached to personal computers, mobile computers, mobile telephones, PDAs and the like because of improvements in the image processing capability of semiconductor devices and the like, and this spurs the demand for a high-performance imaging device.

For size reduction of such imaging devices, a proposal has been made that the zoom lens system is bent in the middle of the optical path to thereby reduce the size without changing the optical path length. For example, Japanese Laid-Open Patent Application No. H11-196303 proposes an imaging device in which in a minus lead zoom lens system, a reflecting surface is provided on the optical path, the optical path is bent substantially 90 degrees by the reflecting surface and then, passes through a movable lens unit, and an optical image is formed on the image sensing element. In the imaging device disclosed in this patent application, a reflecting surface is provided on the image side of a stationary lens element having a negative meniscus configuration, and the optical path is bent substantially 90 degrees by the reflecting surface and then, passes through two movable positive lens units and a stationary positive lens unit to reach the image sensing element.

As another example, Japanese Laid-Open Patent Application No. H11-258678 discloses a structure such that a reflecting surface is provided on the image side of a stationary lens element having a negative meniscus configuration and a movable positive lens unit and the optical path is bent substantially 90 degrees by the reflecting surface and then, passes through a positive lens unit to reach the image sensing element.

Further, Japanese Laid-Open Patent Application No. H08-248318 discloses a zoom lens system comprising from the object side a first lens unit having positive optical power, a second lens unit having negative optical power, a third lens unit having positive optical power and a fourth lens unit having positive optical power. The first lens unit comprises from the object side a negative lens element, a right-angle prism, a positive lens element and a doublet lens element consisting of a negative lens element and a positive lens element.

Further, Japanese Laid-Open Patent Application No. 2000-131610 discloses a zoom lens system comprising from the object side a first lens unit having positive optical power, a second lens unit having negative optical power, a third lens unit having positive optical power and a fourth lens unit having positive optical power. The first lens unit comprises from the object side a negative lens element, a right-angle prism and a positive lens element.

However, in Japanese Laid-Open Patent Applications Nos. H11-196303 and H11-258678, only lens barrel structures are disclosed and no concrete structures of the zoom lens systems are shown. In the case of an imaging device having a zoom lens system, it is difficult to reduce the overall size unless the zoom lens system occupying the largest space is optimized.

Moreover, the zoom lens systems described in Japanese Laid-Open Patent Applications Nos. H08-248318 and 2000-131610 lack in compactness because the first lens unit is very large.

SUMMARY OF THE INVENTION

An object of the present invention is to provide an improved imaging device.

Another object of the present invention is to provide an imaging device being compact although having a high-performance and high-magnification zoom lens system.

The above-mentioned objects are attained by an imaging device comprises a zoom lens system comprising a plurality of lens units and forming an optical image of an object so as to be continuously and optically zoomable by varying a distance between the lens units; and an image sensing element converting the optical image formed by the zoom lens system into an electric signal, wherein the zoom lens system comprises from the object side: a first lens unit having positive optical power as a whole and including a right-angle prism having an internal reflecting surface that bends a luminous flux substantially 90 degrees; a second lens unit having negative optical power and disposed with a variable air space from the first lens unit; a third lens unit having positive optical power and disposed with a variable air space from the second lens unit; and a fourth lens unit having positive optical power and disposed with a variable air space from the third lens unit, and zooming is optically performed by varying the air spaces between the lens units, and wherein the following condition is satisfied:

$$Np \geq 1.8$$

where Np is a refractive index to a d-line of the right-angle prism.

The above-mentioned objects are attained further by an imaging device comprises a zoom lens system comprising a plurality of lens units and forming an optical image of an object so as to be continuously and optically zoomable by varying a distance between the lens units; and an image sensing element converting the optical image formed by the zoom lens system into an electric signal, wherein the zoom lens system comprises from the object side: a first lens unit having positive optical power as a whole and including a right-angle prism having an internal reflecting surface that bends a luminous flux substantially 90 degrees; a second lens unit having negative optical power and disposed with a variable air space from the first lens unit; a third lens unit having positive optical power and disposed with a variable air space from the second lens unit; a fourth lens unit having positive optical power and disposed with a variable air space from the third lens unit; and a fifth lens unit disposed with a variable air space from the fourth lens unit, and zooming is optically performed by varying the air spaces between the lens units.

The above-mentioned object are attained by a digital camera including the above-described imaging device. While the term digital camera conventionally refers to one that records optical still images, ones that can handle moving images as well and household video cameras have been proposed and presently, no particular distinction is drawn between ones handling still images and ones handling moving images. Therefore, in the description that follows, the term digital camera includes all the cameras such as digital still cameras and digital movie cameras whose principal component is an imaging device having an image sensing element that converts the optical image formed on the light receiving surface of the image sensing element into an electric signal.

BRIEF DESCRIPTION OF THE DRAWINGS

This and other objects and features of this invention will become clear from the following description, taken in conjunction with the preferred embodiments with reference to the accompanied drawings in which:

FIGS. 9A to 9I are graphic representations of aberrations of the first embodiment in in-focus state at infinity;

FIGS. 10A to 10I are graphic representations of aberrations of the second embodiment in in-focus state at infinity;

FIGS. 11A to 11I are graphic representations of aberrations of the third embodiment in in-focus state at infinity;

FIGS. 12A to 12I are graphic representations of aberrations of the fourth embodiment in in-focus state at infinity;

FIGS. 13A to 13I are graphic representations of aberrations of the fifth embodiment in in-focus state at infinity;

FIGS. 14A to 14I are graphic representations of aberrations of the sixth embodiment in in-focus state at infinity;

FIGS. 15A to 15I are graphic representations of aberrations of the seventh embodiment in in-focus state at infinity;

FIGS. 16A and 16I are graphic representations of aberrations of the eighth embodiment in in-focus state at infinity;

DESCRIPTION OF THE PREFERRED EMBODIMENTS

Figure 17:
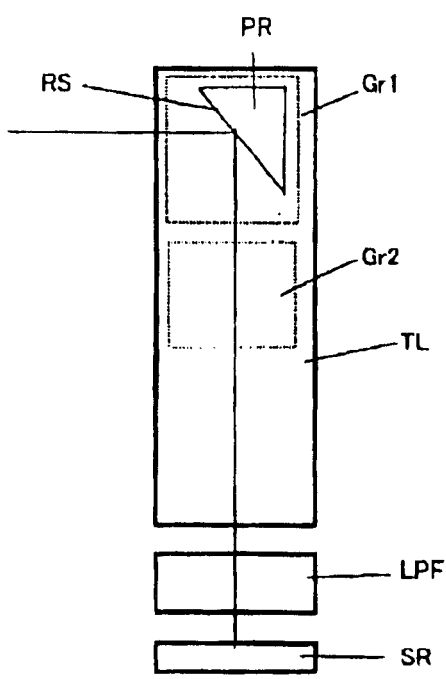
FIG. 17 is a view schematically showing the structure of the present invention.

Hereinafter, an embodiment of the present invention will be described with reference to the drawings. An imaging device according to the embodiment of the present invention comprises, for example, as shown in FIG. 17, from the object side (subject side): a zoom lens system (TL) forming an optical image of an object so as to be zoomable; an optical low pass filter (LPF); and an image sensing element (SR) converting the optical image formed by the zoom lens system (TL) into an electric signal. The zoom lens system comprises: a first lens unit Gr having inside a prism (PR) having a reflecting surface; and a succeeding lens unit. The imaging device is a principal component of a digital camera, a digital video camera and a camera incorporated in or externally attached to a personal computer, a mobile computer, a mobile telephone, a PDA and the like.

The zoom lens system (TL) comprises a plurality of lens units including the first lens unit (Gr1), and is capable of varying the size of the optical image by varying the distance between the lens units. The first lens unit (Gr1) has positive optical power, and has inside the prism PR bending the optical axis of the object light substantially 90 degrees.

The optical low pass filter (LPF) has a specific cut-off frequency for adjusting the spatial frequency characteristic of the taking lens system to eliminate chromatic moire caused at the image sensing element. The optical low pass filter of the embodiment is a birefringent low pass filter formed by laminating a birefringent material such as crystal with its crystallographic axis adjusted in a predetermined direction or a wave plate that changes a plane of polarization. As the optical low pass filter, a phase low pass filter that attains a necessary optical cut-off frequency characteristic by a diffraction effect may be adopted.

The image sensing element (SR) comprises a CCD having a plurality of pixels, and converts the optical image formed by the zoom lens system into an electric signal by the CCD. The signal generated by the image sensing element (SR) undergoes predetermined digital image processing, image compression processing and the like as required and is recorded into a memory (a semiconductor memory, an optical disk, etc.) as a digital video signal, or in some cases, is transferred to another apparatus through a cable or after converted into an infrared signal. A CMOS sensor may be used instead of a CCD.

FIGS. 1 to 8 are views showing the lens arrangements, in the shortest focal length condition, of zoom lens systems included in imaging devices according to a first to an eighth embodiment of the present invention. In these figures, the right-angle prism PR having the internal reflecting surface is expressed as a parallel plate or a lens element, and the optical path is expressed as a line.

Figure 1:
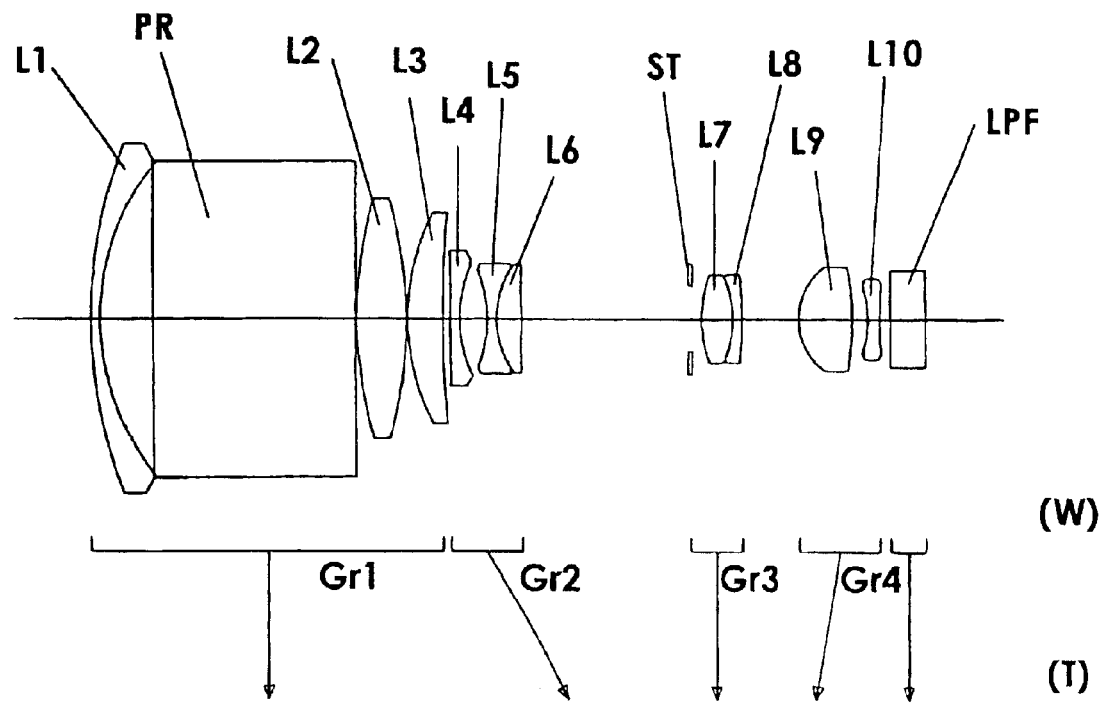
FIG. 1 is a view showing the lens arrangement of a first embodiment (first example)
Figure 18:
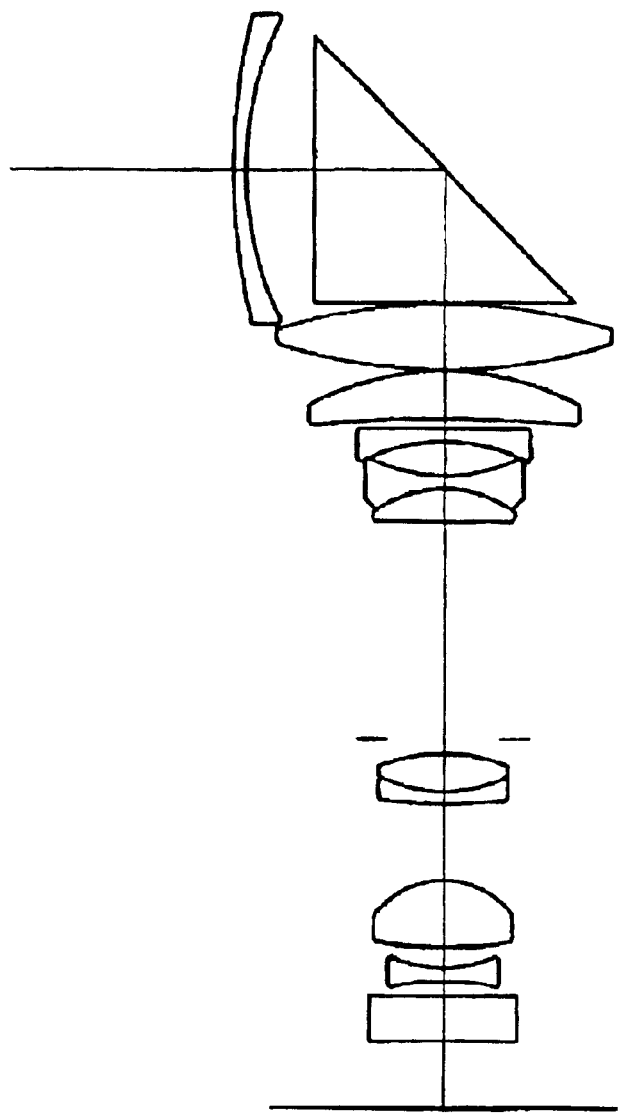
FIG. 18 is a structural view showing the use condition at the shortest focal length of a zoom lens system of the first embodiment of the present invention.

The zoom lens system included in the imaging device according to the first embodiment shown in FIG. 1 comprises from the object side: a first lens unit Gr1 having positive optical power and being stationary with respect to the image surface during zooming; a second lens unit Gr2 having negative optical power and moving from the object side to the image side with respect to the image surface during zooming from the shortest focal length condition to the longest focal length condition; a diaphragm ST; a third lens unit Gr3 having positive optical power and being stationary with respect to the image surface during zooming; and a fourth lens unit Gr4 having positive optical power and moving from the image side to the object side with respect to the image surface during zooming from the shortest focal length condition to the longest focal length condition. Of these, the first lens unit Gr1 comprises from the object side: a first lens element L1 having a negative meniscus configuration convex to the object side; a right-angle prism PR expressed as a parallel plate in the figure; a second lens element L2 having a bi-convex configuration; and a third lens element L3 having a positive meniscus configuration convex to the object side. FIG. 18 shows the actual arrangement, in the shortest focal length condition, of the zoom lens system according to the imaging device of the first embodiment. The element corresponding to the parallel plate in FIG. 1 is the right-angle prism PR as is apparent from FIG. 18.

Figure 2:
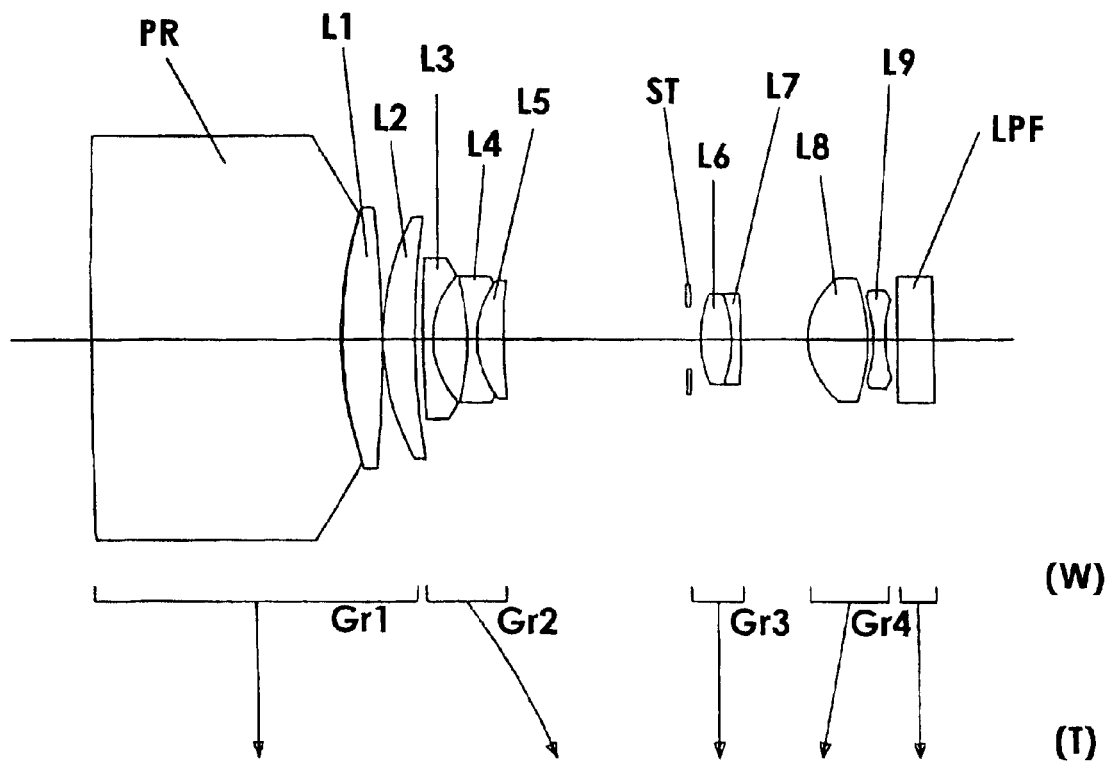
FIG. 2 is a view showing the lens arrangement of a second embodiment (second example)

The zoom lens system included in the imaging device according to the second embodiment shown in FIG. 2 comprises from the object side: a first lens unit Gr1 having positive optical power and being stationary with respect to the image surface during zooming; a second lens unit Gr2 having negative optical power and moving from the object side to the image side with respect to the image surface during zooming from the shortest focal length condition to the longest focal length condition; a diaphragm ST; a third lens unit Gr3 having positive optical power and being stationary with respect to the image surface during zooming; and a fourth lens unit Gr4 having positive optical power and moving from the image side to the object side with respect to the image surface during zooming from the shortest focal length condition to the longest focal length condition. Of these, the first lens unit Gr1 comprises from the object side: a right-angle prism PR having inside a reflecting surface, whose object side in the figure is expressed as a surface having weak positive optical power and whose image side is expressed as a surface having negative optical power; a first lens element L1 having a bi-convex configuration; and a second lens element L2 having a positive meniscus configuration convex to the object side.

Figure 3:
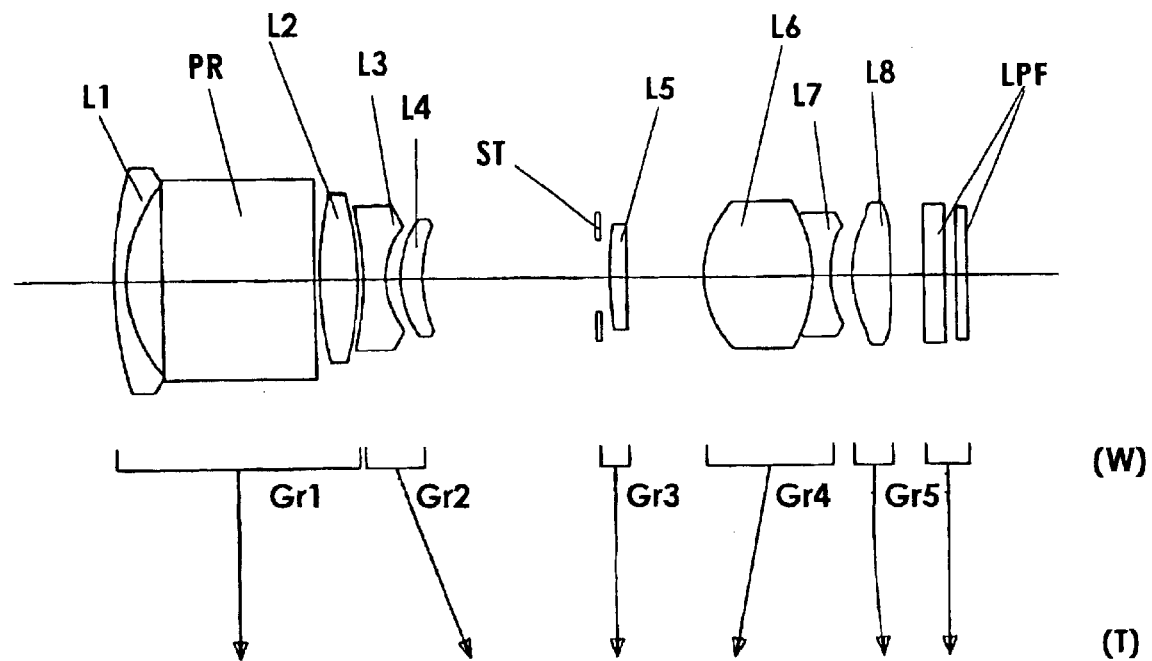
FIG. 3 is a view showing the lens arrangement of a third embodiment (third example)

The zoom lens system included in the imaging device according to the third embodiment shown in FIG. 3 comprises from the object side: a first lens unit Gr1 having positive optical power and being stationary with respect to the image surface during zooming; a second lens unit Gr2 having negative optical power and moving from the object side to the image side with respect to the image surface during zooming from the shortest focal length condition to the longest focal length condition; a diaphragm ST; a third lens unit Gr3 having positive optical power and being stationary with respect to the image surface during zooming; a fourth lens unit Gr4 having positive optical power and moving from the image side to the object side with respect to the image surface during zooming from the shortest focal length condition to the longest focal length condition; and a fifth lens unit Gr5 having negative optical power and being stationary with respect to the image surface during zooming. Of these, the first lens unit Gr1 comprises from the object side: a first lens element L1 having a negative meniscus configuration convex to the object side; a right-angle prism PR expressed as a parallel plate in the figure; and a second lens element L2 having a bi-convex configuration. The fifth lens unit Gr5 comprises only a lens element L8 having a positive meniscus configuration convex to the object side.

Figure 4:
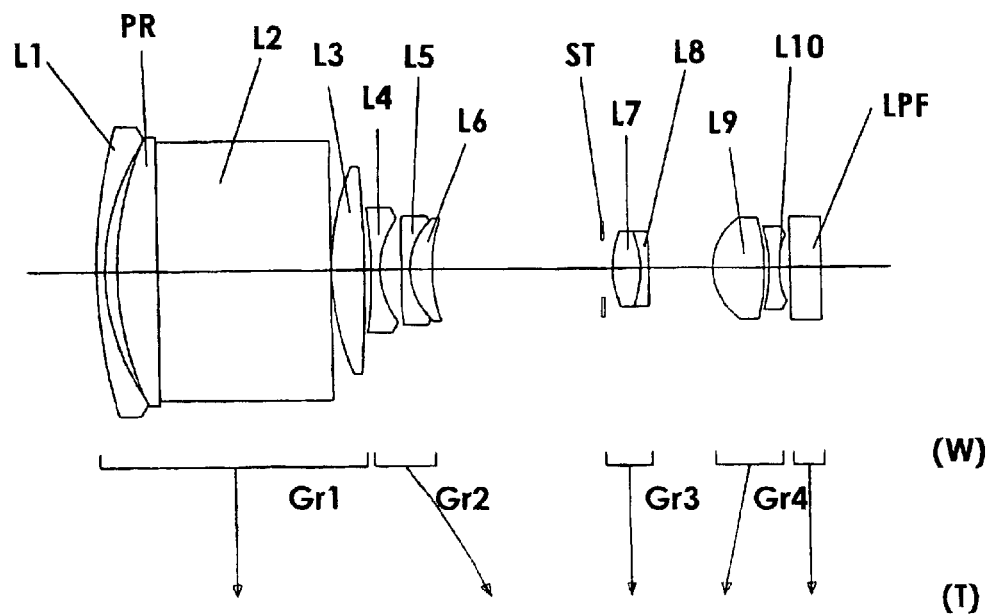
FIG. 4 is a view showing the lens arrangement of a fourth embodiment (fourth example)

The zoom lens system included in the imaging device according to the fourth embodiment shown in FIG. 4 comprises from the object side: a first lens unit GR1 having positive optical power and being stationary with respect to the image surface during zooming; a second lens unit Gr2 having negative optical power and moving from the object side to the image side with respect to the image surface during zooming from the shortest focal length condition to the longest focal length condition; a diaphragm ST; a third lens unit GR3 having positive optical power and being stationary with respect to the image surface during zooming; and a fourth lens unit Gr4 having positive optical power and moving from the image side to the object side with respect to the image surface during zooming from the shortest focal length condition to the longest focal length condition. Of these, the first lens unit Gr1 comprises from the object side: a first lens element L1 having a negative meniscus configuration convex to the object side; a second lens element L2 having a positive meniscus configuration convex to the object side; a right-angle prism PR expressed as a parallel plate in the figure; and a third lens element L3 having a bi-convex configuration.

Figure 5:
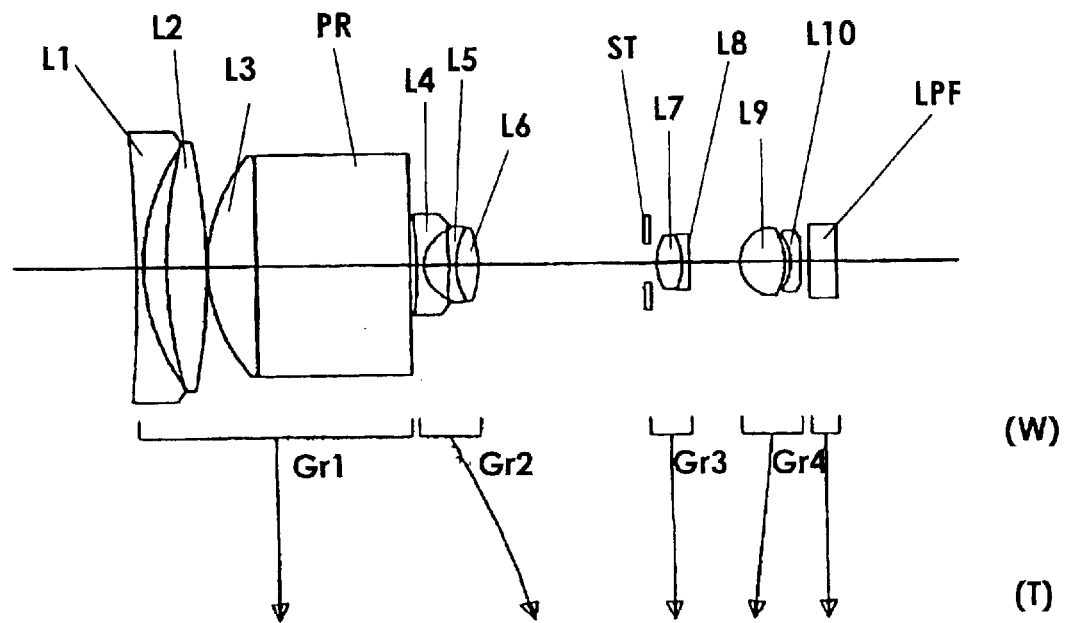
FIG. 5 is a view showing the lens arrangement of a fifth embodiment (fifth example)

The zoom lens system included in the imaging device according to the fifth embodiment shown in FIG. 5 comprises from the object side: a first lens unit GR1 having positive optical power and being stationary with respect to the image surface during zooming; a second lens unit Gr2 having negative optical power and moving from the object side to the image side with respect to the image surface during zooming from the shortest focal length condition to the longest focal length condition; a diaphragm ST; a third lens unit GR3 having positive optical power and being stationary with respect to the image surface during zooming; and a fourth lens unit Gr4 having positive optical power and moving from the image side to the object side with respect to the image surface during zooming from the shortest focal length condition to the longest focal length condition. Of these, the first lens unit Gr1 comprises from the object side: a first lens element L1 having a bi-concave configuration; a second lens element L2 having a bi-convex configuration; a third lens element L3 having a positive meniscus configuration convex to the object side; and a right-angle prism PR expressed as a parallel plate in the figure.

Figure 6:
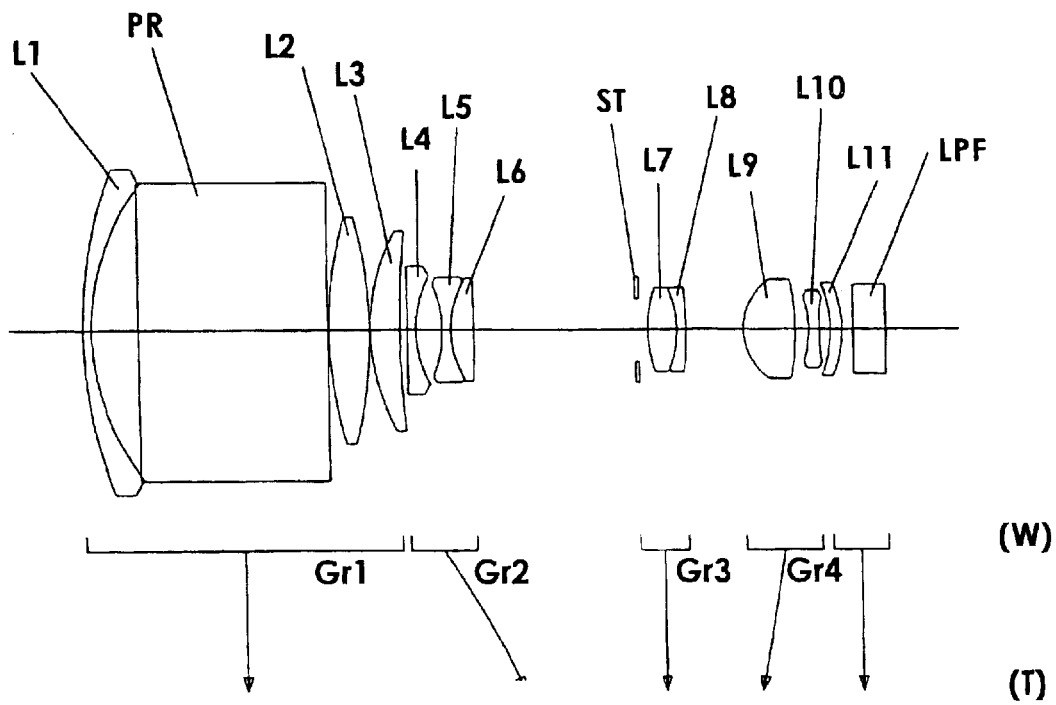
FIG. 6 is a view showing the lens arrangement of a sixth embodiment (sixth example)

The zoom lens system included in the imaging device according to the sixth embodiment shown in FIG. 6 comprises from the object side: a first lens unit GR1 having positive optical power and being stationary with respect to the image surface during zooming; a second lens unit Gr2 having negative optical power and moving from the object side to the image side with respect to the image surface during zooming from the shortest focal length condition to the longest focal length condition; a diaphragm ST; a third lens unit GR3 having positive optical power and being stationary with respect to the image surface during zooming; a fourth lens unit Gr4 having positive optical power and moving from the image side to the object side with respect to the image surface during zooming from the shortest focal length condition to the longest focal length condition; and a fifth lens unit Gr5 having positive optical power and being stationary with respect to the image surface during zooming. Of these, the first lens unit Gr1 comprises from the object side: a first lens element L1 having a negative meniscus configuration convex to the object side; a right-angle prism PR expressed as a parallel plate in the figure; a second lens element L2 having a bi-convex configuration; and a third lens element having a positive meniscus configuration convex to the object side. The fifth lens unit Gr5 comprises only a lens element L11 having a positive meniscus configuration concave to the object side.

Figure 7:
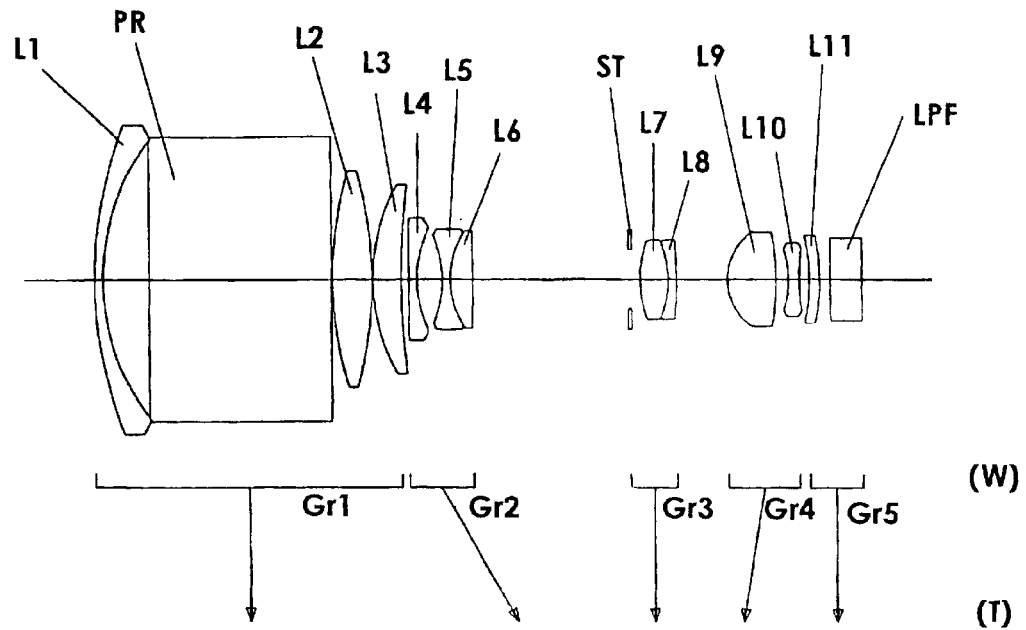
FIG. 7 is a view showing the lens arrangement of a seventh embodiment (seventh example)

The zoom lens system included in the imaging device according to the seventh embodiment shown in FIG. 7 comprises from the object side: a first lens unit GR1 having positive optical power and being stationary with respect to the image surface during zooming; a second lens unit Gr2 having negative optical power and moving from the object side to the image side with respect to the image surface during zooming from the shortest focal length condition to the longest focal length condition; a diaphragm ST; a third lens unit GR3 having positive optical power and being stationary with respect to the image surface during zooming; a fourth lens unit Gr4 having positive optical power and moving from the image side to the object side with respect to the image surface during zooming from the shortest focal length condition to the longest focal length condition; and a fifth lens unit Gr5 having positive optical power and being stationary with respect to the image surface during zooming. Of these, the first lens unit Gr1 comprises from the object side: a first lens element L1 having a negative meniscus configuration convex to the object side; a right-angle prism PR expressed as a parallel plate in the figure; a second lens element L2 having a bi-convex configuration; and a third lens element L3 having a positive meniscus configuration convex to the object side. The fifth lens unit Gr5 comprises only a lens element L11 having a positive meniscus configuration concave to the object side.

Figure 8:
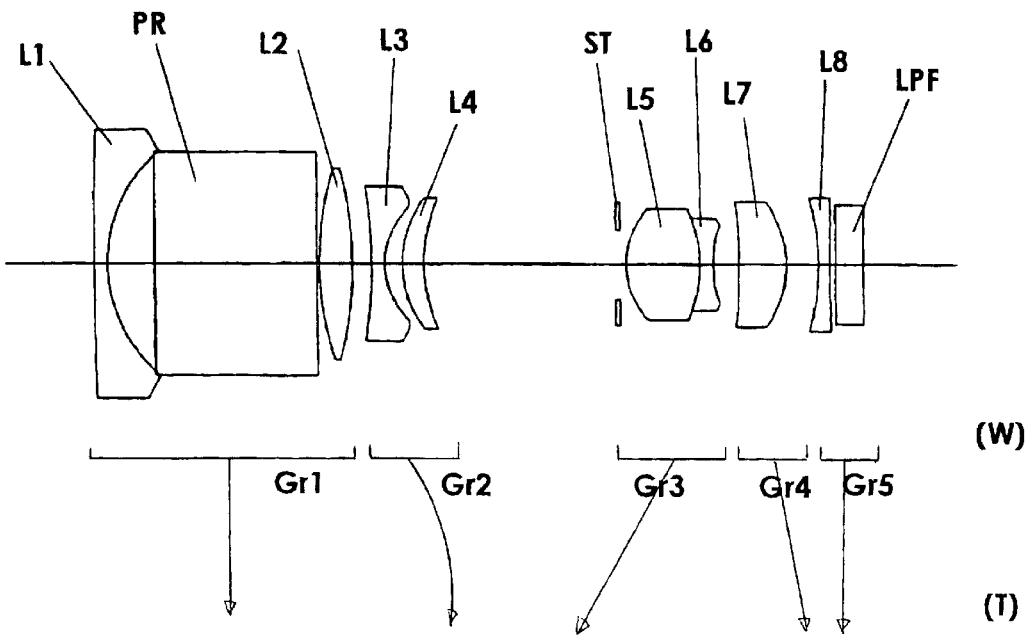
FIG. 8 is a view showing the lens arrangement of an eighth embodiment (eighth example)

The zoom lens system included in the imaging device according to the eighth embodiment shown in FIG. 8 comprises from the object side: a first lens unit GR1 having positive optical power and being stationary with respect to the image surface during zooming; a second lens unit Gr2 having negative optical power and moving from the object side to the image side with respect to the image surface during zooming from the shortest focal length condition to the longest focal length condition; a diaphragm ST; a third lens unit GR3 having positive optical power and being stationary with respect to the image surface during zooming; a fourth lens unit Gr4 having positive optical power and moving from the image side to the object side with respect to the image surface during zooming from the shortest focal length condition to the longest focal length condition; and a fifth lens unit Gr5 having negative optical power and being stationary with respect to the image surface during zooming. Of these, the first lens unit Gr1 comprises from the object side: a first lens element L1 having a negative meniscus configuration convex to the object side; a right-angle prism PR expressed as a parallel plate in the figure; and a second lens element L2 having a bi-convex configuration. The fifth lens unit Gr5 comprises only a lens element L8 having a negative meniscus configuration concave to the object side.

The zoom lens systems of the embodiments have in the first lens unit the prism PR having a reflecting surface that bends the optical axis of the object light substantially 90 degrees. By thus bending the optical axis of the object light substantially 90 degrees, apparent thickness reduction of the imaging device is attained.

Taking digital cameras as an example, the component occupying the largest space in the apparatus is the imaging device including a zoom lens system. In particular, when in digital cameras, the optical elements such as the lens elements and the diaphragm included in the zoom lens system are arranged in a line without the direction of the optical axis changed like in conventional lens-shutter film-based cameras, the size in the direction of thickness of the camera substantially depends on the distance from the most object side element of the zoom lens system included in the imaging device to the image sensing element. However, with recent increase in the number of pixels of the image sensing element, the aberration correction level of the imaging device has dramatically improved. Consequently, the number of lens elements of the zoom lens system included in the imaging device is steadily increasing, and even when the camera is in a nonuse condition (so-called collapsed condition), it is difficult to attain thickness reduction because of the thickness of the lens elements.

On the contrary, by adopting the structure that the optical axis of the object light is bent substantially 90 degrees by the reflecting surface like in the zoom lens systems of the embodiments, the size in the direction of thickness of the imaging device is reduced to the distance from the most object side lens element to the reflecting surface when the camera is in the nonuse condition, so that apparent thickness reduction of the imaging device is attained. Moreover, by adopting the structure that the optical axis of the object light is bent substantially 90 degrees by the reflecting surface, the optical path of the object light can be made to overlap in the neighborhood of the reflecting surface, so that the space is effectively used. Consequently, further size reduction of the imaging device is attained.

It is preferable that the reflecting surface be situated in the first lens unit G1. By disposing the reflecting surface in the first lens unit Gr1 situated on the most object side, the size in the direction of thickness of the imaging device is minimized.

As the reflecting surface, any of (a) an internal reflection prism, (b) a surface reflection prism, (c) an internal reflection plane mirror and (d) a surface reflection mirror may be adopted. However, (a) the internal reflection prism is most suitable. By adopting the internal reflection prism, the object light passes through the medium of the prism, so that the surface separation when the object light passes through the prism is a converted surface separation shorter than the normal air space and the physical distance in accordance with the refractive index of the medium. Therefore, when the internal reflection prism is adopted as the structure of the reflecting surface, an optically equivalent structure is attained with a smaller space, which is desirable.

When the reflecting surface comprises an internal reflection prism, it is preferable that the material of the prism satisfy the following condition (1):

$$Np \geq 1.80 \tag{1}$$

here,

Np represents the refractive index to the d-line of the prism

When the refractive index of the prism is lower than this range, contribution to size reduction is small, which is undesirable. Moreover, when the refractive index is lower than the range, since the principal ray in the shortest focal length condition is small in the angle of inclination in the right-angle prism PR, a total reflection condition is approached and the light quantity loss is small, which is desirable.

In addition to the above-mentioned range, it is preferable that the refractive index be in the following range (1)':

$$Np \geq -1.84 \tag{1}'$$

Moreover, it is unnecessary that the reflecting surface be a complete totally reflecting surface. The reflectance of part of the reflecting surface may be adjusted as appropriate so that part of the objective light branches so as to be incident on a sensor for metering or distance measurement. Further, the reflectance of the entire area of the reflecting surface may be adjusted as appropriate so that the finder light branches. Further, while the incident surface and the exit surface of the prism are both plane surfaces in the embodiments, they may have optical power.

It is preferable that zoom lens system satisfy the following condition (2):

$$1.0 < D/fw < 2.6 \tag{2}$$

here

D represents an axial distance between surface at the most object side surface of the first lens unit and reflection surface; and fw represents a focal length of the entire zoom lens system in a wide angle condition.

The condition (2) defines the preferable relation the axial distance between surface at the most object side surface of the first lens unit and reflection surface. This condition (2) is required to miniaturize the entire optical system having reflection surface. If the lower limit of condition (2) were be transgressed, the optical power of the lens elements at the object side of the reflection surface would be too strong. This would cause a distortion so large (especially the negative distortion on the wide-angle end) that it would be impossible to secure satisfactory optical performance. By contrast, if the upper limit of condition (2) were to be transgressed, the axial distance between surface at the most object side surface of the first lens unit and reflection surface would be too long, which is undesirable in term of miniaturization. In addition to the above-mentioned range, it is preferable that the following range (2)' is fulfilled:

$$D/fw < 2.2 \tag{2}'$$

It is preferable that not more than two, particularly, not more than one lens element be disposed on the object side of the reflecting surface. In the structure having, in the first lens unit Gr1, the prism PR having a reflecting surface that bends the optical axis of the object light substantially 90 degrees, since the substantial thickness of the optical system depends on the distance from the object side surface of the lens element disposed on the most object side to the reflecting surface, by disposing not more than two, particularly, not more than one lens element on the object side of the reflecting surface, a thin optical system is obtained.

It is preferable that zoom lens system satisfy the following condition (3), if only one lens element is disposed on the object side of the reflecting surface.

$$-11.0 < fa/fw < -2.5 \tag{3}$$

here fa represents a focal length of one lens element be disposed on the object side of the reflecting surface; and fw represents a focal length of the entire zoom lens system in a wide angle condition.

The condition (3) defines one lens element be disposed on the object side of the reflecting surface. The range of the condition (3) would be satisfied, it is possible for reflection surface to make the incident position of the ray emitted from one lens element be disposed on the object side of the reflecting surface close to optical axis. This would cause that thickness of the reflection portion including the reflection surface make small. In particular, if the internal reflection surface in the optical prism is adopted as the reflection surface, it is more effective to attain the miniaturization of the zoom lens system and keeping the intensity of the illumination on the image sensor.

In addition to the above-mentioned range, it is preferable that the following range (3)' is fulfilled:

$$-5.0 < fa/fw < -3.0 \tag{3}'$$

If the zoom lens system fulfills the range (3)', this would make it more compact and smaller.

Further, it is preferable that the first lens unit Gr1 be stationary with respect to the image surface during zooming. Since the first lens unit Gr1 includes the reflecting surface, a large space is required to move the first lens unit Gr1, and particularly, when the reflecting surface comprises a prism, it is necessary to move a large-weight prism, so that a heavy load is placed on the driving mechanism, which is undesirable. Moreover, by the first lens unit being stationary with respect to the image surface during zooming, an optical system whose overall length does not vary is obtained.

It is preferable that zoom lens system satisfy the following condition (4) if the first lens unit Gr1 be stationary with respect to the image surface during zooming:

$$3.0 < f1/fw < 7.0 \tag{4}$$

here f1 represents a focal length of the first lens unit; and fw represents a focal length of the entire zoom lens system in a wide angle condition. The condition (4) defines the preferable relation both miniaturization and aberration correction of the zoom lens system. If the lower limit of condition (4) were to be transgressed, the positive optical power of the first lens unit would be too weak. This would make the total optical power of the lens unit weak, and thus, it is impossible to attain the compact zoom lens system. By contrast, if the upper limit of the condition (4) were to be transgressed, it would be impossible to correct the spherical aberration caused at the first lens unit.

Moreover, the third lens unit Gr3 comprises only a single lens element or a single doublet lens element consisting of a positive lens element and a negative lens element cemented together. By thus simplifying the third lens unit, the cost and the size are reduced Moreover, it is preferable that the fifth lens unit Gr5 be stationary with respect to the image surface like in the third, the sixth, the seventh and the eighth embodiments. By the fifth lens unit Gr5 being stationary, the lens barrel structure is simplified and the lens barrel can be integrated with the image sensing element, so that the number of parts is reduced, which is desirable.

Moreover, when the fifth lens unit Gr5 has negative optical power like in the third and the fifth embodiments, since a lens element having stronger optical power can be used in the third and the fourth lens units, the overall length of the optical system is reduced, which is desirable.

Moreover, when the fifth lens unit Gr5 has positive optical power like in the sixth and the seventh embodiments, the distance from the position of the exit pupil of the zoom lens system to the image surface can be increased, so that the principal rays incident on the image sensing element are close to parallel to each other, which is desirable. With this structure, the peripheral illumination at the image sensing element is ensured and an excellent image is obtained.

While the lens elements included in the lens units constituting the embodiments are all refractive type lens elements that deflect the incident ray by refraction (that is, lens elements of a type in which the incident ray is deflected at the interface between media having different refractive indices), the present invention is not limited thereto. For example, the lens elements may be diffractive type lens elements that deflect the incident ray by diffraction, refraction-diffraction hybrid lens elements that deflect the incident ray by a combination of diffraction and refraction, or gradient index lens elements that deflect the incident ray by the distribution of refractive index in the medium.

The arrangements of the zoom lens systems included in the imaging devices embodying the present invention will be further concretely described with reference to construction data and graphic representations of aberrations. A first to an eighth example described here corresponds to the above-described first to eighth embodiments, respectively, and FIGS. 1 to 8 showing the lens arrangements of the first to the eighth embodiments show the lens arrangements of the corresponding first to eighth examples.

In the construction data of the examples, ri (i=1,2,3, ...) represents the radius of curvature (mm) of the i-th surface counted from the object side, di (i=1,2,3, ...) represents the i-th axial distance (mm) counted from the object side, and Ni (i=1,2,3, ...) and vi (i=1,2,3, ...) represent the refractive index (Nd) and the Abbe number (vd) to the d-line of the i-th optical element counted from the object side. Moreover, in the construction data, as the axial distance that varies during zooming, the values of the variable distance in the shortest focal length condition (wide angle limit, W), in the middle focal length condition (middle, M) and in the longest focal length condition (telephoto limit, T) are shown. The overall focal lengths (f, mm) in the focal length conditions (W), (M) and (T) and the f-numbers (FNO) are shown as well.

The surfaces whose radii of curvature ri are marked with asterisks are aspherical, and are defined by the following expression (AS) expressing the aspherical surface configuration. Aspherical data of the embodiments is shown as well.

$$x = \frac{C_0 y^2}{1 + \sqrt{1 - \varepsilon C_0^2 y^2}} + \sum Ai y^i \quad (AS)$$

where, x represents the shape (mm) of the aspherical surface (i.e., the displacement along the optical axis at the height y in a direction perpendicular to the optical axis of the aspherical surface), Co represents the curvature ($mm^{-1}$) of the reference aspherical surface of the aspherical surface, y represents the height in a direction perpendicular to the optical axis, $\varepsilon$ represents the quadric surface parameter, and Ai represents the aspherical coefficient of order i.

TABLE 1

<Example 1>
f = 5.6 – 13.5 – 32.6 mm
Fno. = 2.89 – 3.38 – 3.60

| [Radius of Curvature] | [Axial Distance] | [Refractive Index(Nd)] | [Abbe Number] |
|---|---|---|---|
| r1 = 42.976 | d1 = 0.800 | N1 = 1.84666 | v1 = 23.82 |
| r2 = 22.430 | d2 = 4.593 | | |
| r3 = ∞ | d3 = 17.600 | N2 = 1.84666 | v2 = 23.82 |
| r4 = ∞ | d4 = 0.100 | | |
| r5 = 38.720 | d5 = 4.273 | N3 = 1.49310 | v3 = 83.58 |
| r6 = –39.273 | d6 = 0.100 | | |
| r7 = 19.687 | d7 = 3.169 | N4 = 1.48749 | v4 = 70.44 |
| r8 = 97.433 | d8 = 0.700 – 8.404 – 14.933 | | |
| r9 = –401.970 | d9 = 0.800 | N5 = 1.80500 | v5 = 40.97 |
| r10 = 11.754 | d10 = 2.415 | | |
| r11* = 10.345 | d11 = 0.800 | N6 = 1.75450 | v6 = 51.57 |
| r12 = 8.268 | d12 = 2.183 | N7 = 1.84666 | v7 = 23.82 |
| r13* = –128.925 | d13 = 14.733 – 7.029 – 0.500 | | |
| r14 = ∞ | d14 = 1.000 | | |
| r15 = 11.027 | d15 = 2.764 | N8 = 1.58144 | v8 = 40.89 |
| r16 = –9.008 | d16 = 0.800 | N9 = 1.84666 | v8 = 23.82 |
| r17 = –39.341 | d17 = 5.038 – 1.984 – 0.800 | | |
| r18 = 5.711 | d18 = 4.656 | N10 = 1.51823 | v8 = 58.9 |
| r19 = –25.611 | d19 = 1.370 | | |
| r20* = –9.984 | d20 = 1.000 | N11 = 1.84666 | v11 = 23.82 |
| r21* = 52.924 | d21 = 1.000 – 4.054 – 5.238 | | |
| r22 = ∞ | d22 = 1.000 | N12 = 1.84666 | v12 = 64.20 |
| r23 = ∞ | | | |

[Aspherical Coefficient]

11th surface (r11*)

$\varepsilon$ = 0.10000000E+01
A4 = 0.31266911E-03
A6 = -0.85896693E-05
A8 = 0.43976710E-06
A10 = -0.11105729E-07

13th surface (r13*)

$\varepsilon$ = 0.10000000E+01
A4 = 0.22986931E-03
A6 = -0.74720324E-05
A8 = 0.42427446E-06
A10 = -0.11260356E-07

20th surface (r20*)

$\varepsilon$ = 0.10000000E+01
A4 = -0.10354297E-02
A6 = 0.65329318E-04
A8 = -0.26241772E-05
A10 = -0.87823013E-08

21st surface (r21*)

$\varepsilon$ = 0.10000000E+01
A4 = 0.68501565E-03
A6 = 0.10044586E-03
A8 = -0.33745791E-06

TABLE 2

<Example 2>
f = 5.8 – 13.9 – 33.7 mm
Fno. = 2.81 – 3.19 – 3.60

| [Radius of Curvature] | [Axial Distance] | [Refractive Index(Nd)] | [Abbe Number] |
|---|---|---|---|
| r1 = 716.497 | d1 = 21.000 | N1 = 1.84666 | ν1 = 23.82 |
| r2 = 33.821 | d2 = 0.185 | | |
| r3 = 37.734 | d3 = 3.262 | N2 = 1.77250 | ν2 = 49.77 |
| r4 = −109.452 | d4 = 0.100 | | |
| r5 = 21.129 | d5 = 2.774 | N3 = 1.75450 | ν3 = 51.57 |
| r6 = 66.295 | d6 = 0.700 – 9.397 – 15.923 | | |
| r7 = 143.139 | d7 = 0.800 | N4 = 1.80420 | ν4 = 46.50 |
| r8 = 7.776 | d8 = 2.935 | | |
| r9* = −18.458 | d9 = 0.800 | N5 = 1.63854 | ν5 = 55.62 |
| r10 = 8.088 | d10 = 2.231 | N6 = 1.84666 | ν6 = 23.82 |
| r11* = 55.412 | d11 = 15.723 – 7.026 – 0.500 | | |
| r12 = 60.000 | d12 = 1.000 | | |
| r13 = 9.901 | d13 = 2.672 | N7 = 1.54072 | ν7 = 47.20 |
| r14 = −9.925 | d14 = 0.800 | N8 = 1.84666 | ν8 = 23.82 |
| r15 = −52.313 | d15 = 5.646 – 3.013 – 0.800 | | |
| r16 = 6.357 | d16 = 5.102 | N9 = 1.61950 | ν9 = 43.14 |
| r17 = −14.918 | d17 = 0.450 | | |
| r18* = −12.096 | d18 = 1.036 | N10 = 1.84666 | ν10 = 23.82 |
| r19* = 23.070 | d19 = 1.000 – 3.633 – 5.846 | | |
| r20 = ∞ | d20 = 1.000 | N11 = 1.84666 | ν11 = 64.20 |
| r21 = ∞ | | | |

[Aspherical Coefficient]

9th surface (r9*)

ε =   0.10000000E+01
A4 =   0.15268782E−03
A6 = −0.12366121E−04
A8 =   0.62823082E−06
A10 = −0.11161301E−07

11th surface (r11*)

ε =   0.10000000E+01
A4 =   0.11706904E−03
A6 = −0.10151697E−04
A8 =   0.61869296E−06
A10 = −0.12548399E−07

18th surface (r18*)

ε =   0.10000000E+01
A4 =   0.54152316E−04
A6 = −0.86108541E−05
A8 = −0.88047820E−07
A10 = −0.10302489E−07

19th surface (r19*)

ε =   0.10000000E+01
A4 =   0.00000000D+00
A6 =   0.15570223E−02
A8 =   0.33082649E−04
A10 =   0.68998759E−06

TABLE 3

<Example 3>
f = 5.9 – 10.5 – 16.8 mm
Fno. = 2.94 – 3.25 – 3.80

| [Radius of Curvature] | [Axial Distance] | [Refractive Index(Nd)] | [Abbe Number] |
|---|---|---|---|
| r1 = 27.903 | d1 = 0.800 | N1 = 1.84666 | ν1 = 23.82 |
| r2 = 9.684 | d2 = 2.530 | | |
| r3 = ∞ | d3 = 10.320 | N2 = 1.84666 | ν2 = 23.82 |
| r4 = ∞ | d4 = 0.320 | | |
| r4 = 24.919 | d5 = 2.580 | N3 = 1.78831 | ν3 = 47.32 |
| r6 = −21.283 | d6 = 0.403 – 6.678 – 10.403 | | |
| r7* = −18.148 | d7 = 1.500 | N4 = 1.52200 | ν4 = 52.20 |
| r8* = 5.672 | d8 = 1.020 | | |
| r9 = 6.827 | d9 = 1.510 | N5 = 1.84666 | ν5 = 23.82 |
| r10 = 9.258 | d10 = 11.972 – 5.697 – 1.972 | | |
| r11 = ∞ | d11 = 0.800 | | |
| r12 = 29.053 | d12 = 1.130 | N6 = 1.80420 | ν6 = 46.50 |
| r13 = −1806.489 | d13 = 5.421 – 3.071 – 0.300 | | |
| r14 = 7.503 | d14 = 7.400 | N7 = 1.71300 | ν7 = 53.93 |
| r15 = −9.631 | d15 = 1.200 | N8 = 1.84506 | ν8 = 23.66 |
| r16* = 8.937 | d16 = 1.469 – 3.546 – 7.567 | | |
| r17* = 8.000 | d17 = 2.660 | N9 = 1.52200 | ν9 = 52.20 |
| r18* = −95.401 | d18 = 2.173 – 2.346 – 1.095 | | |
| r19 = ∞ | d19 = 1.462 | N10 = 1.51680 | ν10 = 64.20 |
| r20 = ∞ | d20 = 0.700 | | |
| r21 = ∞ | d21 = 0.750 | N11 = 1.51680 | ν11 = 64.20 |
| r22 = ∞ | | | |

[Aspherical Coefficient]

7th surface (r7*)

ε =   0.10000000E+01
A4 =   0.11276E−03
A6 =   0.79631E−05
A8 = −0.91259E−06
A10 =   0.26091E−07

8th surface (r8*)

ε =   0.10000000E+01
A4 = −0.24079E−03
A6 =   0.53357E−04
A8 = −0.69309E−05
A10 =   0.25294E−06

16th surface (r16*)

ε =   0.10000000E+01
A4 =   0.86483E−03
A6 =   0.41209E−04
A8 = −0.10049E−05
A10 =   0.15150E−06

17th surface (r17*)

ε =   0.10000000E+01
A4 = −0.18951E−03
A6 = −0.10984E−04
A8 =   0.36113E−06
A10 = −0.55555E−07

18th surface (r18*)

ε =   0.10000000E+01
A4 =   0.40715E−04
A6 = −0.10984E−04
A8 = −0.55676E−06
A10 = −0.19985E−07

TABLE 4

<Example 4>
f = 5.9 – 10.5 – 16.8 mm
Fno. = 2.73 – 3.13 – 3.60

| [Radius of Curvature] | [Axial Distance] | [Refractive Index(Nd)] | [Abbe Number] |
|---|---|---|---|
| r1 = 56.983 | d1 = 0.800 | N1 = 1.84666 | ν1 = 23.82 |
| r2 = 24.330 | d2 = 1.181 | | |
| r3 = 34.363 | d3 = 3.868 | N2 = 1.49310 | ν2 = 83.58 |
| r4 = ∞ | d4 = 0.100 | | |
| r5 = ∞ | d5 = 17.000 | N3 = 1.84666 | ν3 = 23.82 |
| r6 = ∞ | d6 = 0.100 | | |
| r7 = 28.250 | d7 = 3.225 | N4 = 1.75450 | ν4 = 51.57 |
| r8 = −135.150 | d8 = 0.700 – 9.974 – 16.971 | | |
| r9 = −46.312 | d9 = 0.800 | N5 = 1.80420 | ν5 = 46.50 |
| r10 = 8.785 | d10 = 2.160 | | |
| r11* = −147.496 | d11 = 0.800 | N6 = 1.51680 | ν6 = 64.20 |
| r12 = 7.340 | d12 = 2.143 | N7 = 1.84666 | ν7 = 23.82 |
| r13* = 18.836 | d13 = 16.771 – 7.497 – 0.500 | | |
| r14 = ∞ | d14 = 1.000 | | |
| r15 = 10.812 | d15 = 2.709 | N8 = 1.61293 | ν3 = 36.9 |
| r16 = −10.616 | d16 = 0.800 | N9 = 1.84666 | ν9 = 23.82 |
| r17 = −269.376 | d17 = 6.250 – 3.372 – 0.800 | | |
| r18 = 6.353 | d18 = 5.087 | N10 = 1.63854 | ν10 = 55.62 |
| r19 = −21.777 | d19 = 0.483 | | |
| r20* = −17.136 | d20 = 1.000 | N11 = 1.84666 | ν11 = 23.82 |
| r21* = 15.016 | d21 = 1.000 – 3.879 – 6.450 | | |
| r22 = ∞ | d22 = 3.000 | N11 = 1.51680 | ν11 = 64.20 |
| r23 = ∞ | | | |

[Aspherical Coefficient]

11th surface (r11*)

ε = 0.10000000E+01
A4 = 0.15467876E−03
A6 = −0.18231565E−05
A8 = 0.15399303E−06
A10 = −0.11135388E−08

13th surface (r13*)

ε = 0.10000000E+01
A4 = 0.95101733E−04
A6 = −0.28907301E−05
A8 = 0.22481283E−06
A10 = −0.34154234E−08

20th surface (r20*)

ε = 0.10000000E+01
A4 = −0.11037138E−03
A6 = 0.13467767E−04
A8 = −0.22959919E−05
A10 = 0.68751217E−07

21st surface (r21*)

ε = 0.10000000E+01
A4 = 0.15154977E−02
A6 = 0.51077336E−04
A8 = 0.39903997E−06

TABLE 5

<Example 5>
f = 5.8 – 13.9 – 33.7 mm
Fno. = 2.88 – 3.22 – 3.60

| [Radius of Curvature] | [Axial Distance] | [Refractive Index(Nd)] | [Abbe Number] |
|---|---|---|---|
| r1 = −278.560 | d1 = 0.800 | N1 = 1.84708 | ν1 = 25.09 |
| r2 = 36.840 | d2 = 2.541 | | |
| r3 = 89.393 | d3 = 4.339 | N2 = 1.83254 | ν2 = 41.58 |
| r4 = −108.748 | d4 = 4.339 | | |
| r5 = 29.005 | d5 = 5.289 | N3 = 1.80285 | ν3 = 44.67 |
| r6 = 2272727.250 | d6 = 0.100 | | |
| r7 = ∞ | d7 = 17.000 | N4 = 1.84666 | ν4 = 23.82 |
| r8 = ∞ | d8 = 0.700 – 11.189 – 18.842 | | |
| r9 = −73.702 | d9 = 0.800 | N5 = 1.83668 | ν5 = 41.20 |
| r10 = 6.018 | d10 = 2.768 | | |
| r11* = −29.063 | d11 = 0.800 | N6 = 1.84997 | ν6 = 39.77 |
| r12 = 13.374 | d12 = 2.418 | N7 = 1.84666 | ν7 = 23.82 |
| r13* = 19.820 | d13 = 18.642 – 8.153 – 0.500 | | |
| r14 = ∞ | d14 = 1.000 | | |
| r15 = 9.513 | d15 = 2.800 | N8 = 1.59364 | ν8 = 35.72 |
| r16 = −10.093 | d16 = 0.800 | N9 = 1.84666 | ν9 = 23.82 |
| r17 = −224.334 | d17 = 5.549 – 3.011 – 0.800 | | |
| r18 = 5.738 | d18 = 5.007 | N10 = 1.51291 | ν10 = 67.0 |
| r19 = −11.243 | d19 = 0.632 | | |
| r20* = −8.322 | d20 = 1.000 | N11 = 1.84666 | ν11 = 23.82 |
| r21* = 66.762 | d21 = 1.000 – 3.538 – 5.751 | | |
| r22 = ∞ | d22 = 3.000 | N11 = 1.51680 | ν11 = 64.20 |
| r23 = ∞ | | | |

[Aspherical Coefficient]

11th surface (r11*)

ε = 0.10000000E+01
A4 = 0.59343939E−03
A6 = −0.36841550E−04
A8 = 0.21291323E−05
A10 = −0.35406742E−07

13th surface (r13*)

ε = 0.10000000E+01
A4 = 0.15935681E−03
A6 = −0.28776911E−04
A8 = 0.14421575E−05
A10 = −0.29367485E−07

20th surface (r20*)

ε = 0.10000000E+01
A4 = −0.55689700E−03
A6 = −0.32361993E−04
A8 = 0.64969499E−05
A10 = −0.27246132E−06

21st surface (r21*)

ε = 0.10000000E+01
A4 = 0.89605698E−03
A6 = 0.18183227E−04
A8 = 0.27521909E−05

TABLE 6

<Example 6>
f = 5.5 – 13.2 – 32.0 mm
Fno. = 2.85 – 3.31 – 3.60

| [Radius of Curvature] | [Axial Distance] | [Refractive Index(Nd)] | [Abbe Number] |
|---|---|---|---|
| r1 = 43.319 | d1 = 0.800 | N1 = 1.84666 | ν1 = 23.82 |
| r2 = 23.128 | d2 = 4.294 | | |
| r3 = ∞ | d3 = 17.600 | N2 = 1.84666 | ν2 = 23.82 |
| r4 = ∞ | d4 = 0.100 | | |
| r5 = 37.893 | d5 = 3.745 | N3 = 1.49310 | ν3 = 83.58 |
| r6 = −41.533 | d6 = 0.100 | | |
| r7 = 19.704 | d7 = 2.738 | N4 = 1.48749 | ν4 = 70.4 |
| r8 = 85.324 | d8 = 0.700 – 8.710 – 15.300 | | |
| r9 = −826.603 | d9 = 0.800 | N5 = 1.80500 | ν5 = 40.9 |
| r10 = 10.800 | d10 = 2.443 | | |
| r11* = −10.025 | d11 = 0.800 | | |
| r12 = 9.214 | d12 = 2.120 | N6 = 1.84666 | ν6 = 23.82 |
| r13* = −54.816 | d13 = 15.101 – 7.090 – 0.500 | | |
| r14 = ∞ | d14 = 1.000 | | |
| r15 = 11.377 | d15 = 2.747 | N7 = 1.58144 | ν7 = 40.8 |
| r16 = −9.522 | d16 = 0.800 | N8 = 1.84666 | ν8 = 23.82 |
| r17 = −42.037 | d17 = 5.373 – 2.360 – 0.800 | | |
| r18 = 5.659 | d18 = 4.776 | N9 = 1.51823 | ν9 = 58.9 |
| r19 = −22.288 | d19 = 1.212 | | |
| r20* = −9.893 | d20 = 1.000 | N11 = 1.84666 | ν11 = 23.82 |
| r21* = 49.542 | d21 = 1.000 – 4.013 – 5.571 | | |
| r22* = −12.004 | d22 = 1.063 | N12 = 1.52510 | ν12 = 56.3 |
| r23 = −11.009 | d23 = 1.000 | | |
| r24 = ∞ | d24 = 3.000 | N13 = 1.51680 | ν13 = 64.20 |
| r25 = ∞ | | | |

[Aspherical Coefficient]

11th surface (r11*)

ε = 0.10000000E+01
A4 = 0.34053110E−03
A6 = −0.10368222E−04
A8 = 0.54287260E−06
A10 = −0.13043473E−07

13th surface (r13*)

ε = 0.10000000E+01
A4 = 0.23153194E−03
A6 = −0.85426285E−05
A8 = 0.48803019E−06
A10 = −0.12352988E−07

20th surface (r20*)

ε = 0.10000000E+01
A4 = −0.10412611E−02
A6 = 0.71188154E−04
A8 = −0.24406423E−05
A10 = −0.35738197E−07

21st surface (r21*)

ε = 0.10000000E+01
A4 = 0.60473152E−03
A6 = 0.10690945E−03
A8 = −0.26833622E−06

22nd surface (r22*)

ε = 0.10000000E+01
A4 = −0.21940434E−03
A6 = 0.14522752E−04
A8 = −0.10672771E−05

TABLE 7

<Example 7>
f = 5.6 – 13.5 – 32.6 mm
Fno. = 2.90 – 3.35 – 3.60

| [Radius of Curvature] | [Axial Distance] | [Refractive Index(Nd)] | [Abbe Number] |
|---|---|---|---|
| r1 = 41.041 | d1 = 0.800 | N1 = 1.84666 | ν1 = 23.82 |
| r2 = 22.479 | d2 = 4.529 | | |
| r3 = ∞ | d3 = 17.600 | N2 = 1.84666 | ν2 = 23.82 |
| r4 = ∞ | d4 = 0.100 | | |
| r5 = 37.644 | d5 = 3.855 | N3 = 1.49310 | ν3 = 83.5 |
| r6 = −39.341 | d6 = 0.100 | | |
| r7 = 19.775 | d7 = 2.713 | N4 = 1.48749 | ν4 = 70.4 |
| r8 = 74.324 | d8 = 0.700 – 8.730 – 15.388 | | |
| r9 = 645.820 | d9 = 0.800 | N5 = 1.80500 | ν5 = 40.9 |
| r10 = 11.296 | d10 = 2.483 | | |
| r11* = −10.000 | d11 = 0.800 | N6 = 1.75450 | ν6 = 51.5 |
| r12 = 8.828 | d12 = 2.156 | N7 = 1.84666 | ν7 = 23.82 |
| r13* = −77.640 | d13 = 15.188 – 7.158 – 0.500 | | |
| r14 = ∞ | d14 = 1.000 | | |
| r15 = 11.207 | d15 = 2.728 | N8 = 1.58144 | ν8 = 40.8 |
| r16 = −9.591 | d16 = 0.800 | N9 = 1.84666 | ν9 = 23.82 |
| r17 = −45.106 | d17 = 4.948 – 2.087 – 0.800 | | |
| r18 = 5.653 | d18 = 4.666 | N10 = 1.51823 | ν10 = 58.9 |
| r19 = −24.087 | d19 = 1.205 | | |
| r20* = 11.415 | d20 = 1.000 | N11 = 1.84666 | ν11 = 23.82 |
| r21* = 37.573 | d21 = 1.000 – 3.860 – 5.148 | | |
| r22 = −18.126 | d22 = 1.000 | N12 = 1.48749 | ν2 = 70.4 |
| r23 = −20.000 | d23 = 1.000 | | |
| r24 = ∞ | d24 = 3.000 | N13 = 1.51680 | ν13 = 64.20 |
| r25 = ∞ | | | |

[Aspherical Coefficient]

11th surface (r11*)

ε = 0.10000000E+01
A4 = 0.32308611E−03
A6 = −0.10360500E−04
A8 = 0.50523682E−06
A10 = −0.11357030E−07

13th surface (r13*)

ε = 0.10000000E+01
A4 = 0.23150013E−03
A6 = −0.88946474E−05
A8 = 0.48867355E−06
A10 = −0.11733913E−07

20th surface (r20*)

ε = 0.10000000E+01
A4 = −0.10917547E−02
A6 = 0.61809173E−04
A8 = −0.28913073E−05
A10 = 0.15368950E−07

21st surface (r21*)

ε = 0.10000000E+01
A4 = 0.67041309E−03
A6 = 0.96974698E−04
A8 = 0.13977862E−06

TABLE 8

<Example 8>
f = 5.2 – 9.1 – 15.0 mm
Fno. = 2.57 – 3.01 – 4.10

| [Radius of Curvature] | [Axial Distance] | [Refractive Index(Nd)] | [Abbe Number] |
|---|---|---|---|
| r1* = 722.382 | d1 = 1.000 | N1 = 1.58340 | ν1 = 30.23 |
| r2 = 11.001 | d2 = 3.538 | | |
| r3 = ∞ | d3 = 12.400 | N2 = 1.84666 | ν2 = 23.82 |
| r4 = ∞ | d4 = 0.200 | | |
| r5 = 23.403 | d5 = 2.503 | N3 = 1.71300 | ν3 = 53.93 |
| r6 = −26.818 | d6 = 1.500 – 6.970 – 7.511 | | |
| r7* = −41.180 | d7 = 1.000 | N4 = 1.52510 | ν4 = 56.38 |
| r8* = 5.300 | d8 = 1.323 | | |
| r9 = 7.942 | d9 = 1.659 | N5 = 1.79850 | ν5 = 22.60 |
| r10 = 12.769 | d10 = 14.404 – 6.289 – 1.000 | | |
| r11 = ∞ | d11 = 0.600 | | |
| r12 = 6.162 | d12 = 5.467 | N6 = 1.75450 | ν6 = 51.57 |
| r13 = −9.956 | d13 = 1.000 | N7 = 1.85666 | ν7 = 23.82 |
| r14* = 13.203 | d14 = 1.843 – 4.878 – 11.105 | | |
| r15* = 88.174 | d15 = 3.529 | N8 = 1.52510 | ν8 = 56.38 |
| r16 = −7.910 | d16 = 2.388 – 1.996 – 0.519 | | |
| r17 = −16.793 | d17 = 0.800 | N9 = 1.52510 | ν9 = 56.38 |
| r18 = 399.321 | d18 = 0.376 | | |
| r19 = ∞ | d19 = 2.000 | N13 = 1.51680 | ν13 = 64.20 |
| r20 = ∞ | | | |

[Aspherical Coefficient]

1st surface (r1*)

$\epsilon$ = 0.10000000E+01
A4 = 0.90132905E−05
A6 = 0.87911559E−08
A8 = −0.26009970E−09

7th surface (r7*)

$\epsilon$ = 0.10000000E+01
A4 = −0.45806830E−03
A6 = 0.26599527E−04
A8 = −0.77735298E−06
A10 = 0.93420183E−08

8th surface (r8*)

$\epsilon$ = 0.10000000E+01
A4 = −0.93002236E−03
A6 = 0.97133900E−05
A8 = −0.29442010E−06
A10 = −0.34026342D−07

15th surface (r15*)

$\epsilon$ = 0.10000000E+01
A4 = 0.14135352E−02
A6 = 0.62713097E−04
A8 = 0.24284160E−05
A10 = 0.16450715E−06

16th surface (r16*)

$\epsilon$ = 0.10000000E+01
A4 = −0.89999894E−03
A6 = 0.15222453E−04
A8 = −0.11214913E−05
A10 = 0.28422427E−07

The following Table 8 lists the values of the condition (1)–(4) as actually observed in Examples 1–8.

TABLE 9

| | Np | D/fw | fa/fw | fl/fw |
|---|---|---|---|---|
| ex. 1 | 1.84666 | 2.534 | −10.075 | 4.586 |
| ex. 2 | 1.84666 | 1.81 | — | 5.995 |
| ex. 3 | 1.84666 | 1.408 | −3.030 | 3.786 |
| ex. 4 | 1.84666 | 2.449 | — | 5.755 |
| ex. 5 | 1.84666 | 4.467 | — | 7.229 |
| ex. 6 | 1.84666 | 2.526 | −10.853 | 4.844 |
| ex. 7 | 1.84666 | 2.523 | −10.694 | 4.757 |
| ex. 8 | 1.84666 | 2.065 | −3.6840 | 5.319 |

FIGS. 9A to 9I through 16A to 16I are graphic representations of aberrations of the first to the eighth examples, and show aberrations of the zoom lens systems of the examples in in-focus state at infinity. FIGS. 9A to 9C, 10A to 10C, 11A to 11C, 12A to 12C, 13A to 13C, 14A to 14C, 15A to 15C and 16A to 16C show aberrations {from the left, spherical aberration, sine condition, astigmatism and distortion; Y' (mm) is the maximum image height on the image sensing element (corresponding to the distance from the optical axis)} in the shortest focal length condition (W). FIGS. 9D to 9F, 10D to 10F, 11D to 11F, 12D to 12F, 13D to 13F, 14D to 14F, 15D to 15F 16F show the aberrations in the middle focal length condition (M). FIGS. 9G to 9I, 10G to 10I, 11G to 11I, 12G to 12I, 13G to 13I, 14G to 14I, 15G to 15I and 16G to 16I show the aberrations in the longest focal length condition (T). In the graphic representations of spherical aberration, the solid line (d) represents the spherical aberration to the d-line, the chain line (g) represents the spherical aberration to the g-line, the chain double-dashed line (c) represents the spherical aberration to the c-line, and the broken line (SC) represents the sine condition. In the graphic representations of astigmatism, the broken line (DM) represents astigmatism on the meridional image plane, and the solid line (DS) represents the astigmatism on the sagittal image plane. In the graphic representations of distortion, the solid line represents the distortion % to the d-line.

As described above, according to the imaging device of the present invention, an imaging device being compact although having a high-performance and high-magnification zoom lens system can be provided. When the imaging device of the present invention is applied to the imaging optical system of a digital camera, the application significantly contributes to size reduction of the digital camera.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An imaging device comprising:
   a zoom lens system comprising a plurality of lens units and forming an optical image of an object so as to be continuously and optically zoomable by varying a distance between the lens units; and
   an image sensing element converting the optical image formed by the zoom lens system into an electric signal,
   wherein the zoom lens system comprises from the object side:
   a first lens unit having positive optical power as a whole and including a reflecting surface that bends a luminous flux substantially 90 degrees;
   a second lens unit having negative optical power and disposed with a variable air space from the first lens unit;

a third lens unit having positive optical power and disposed with a variable air space from the second lens unit;

a fourth lens unit having positive optical power and disposed with a variable air space from the third lens unit; and a fifth lens unit disposed with a variable air space from the fourth lens unit, and wherein zooming is optically performed by varying the air spaces between the lens units.

2. An imaging device as claimed in claim 1, wherein the first lens unit includes a right-angle prism having an internal reflecting surface as the reflecting surface.

3. An imaging device as claimed in claim 2, wherein the following condition is satisfied:

$$Np \geq 1.8$$

where Np is a refractive index to a d-line of the right-angle prism.

4. An imaging device as claimed in claim 1, wherein the fifth lens unit has a positive optical power.

5. An imaging device as claimed in claim 1, wherein the fifth lens unit has a negative optical power.

6. An imaging device as claimed in claim 1, wherein the following condition is fulfilled:

$$1.0 < D/fw < 2.6 \qquad (2)$$

here

D represents an axial distance between surface at the most object side surface of the first lens unit and reflection surface; and fw represents a focal length of the entire zoom lens system in a wide angle condition.

7. An imaging device as claimed in claim 1, wherein the zoom lens system has not more than two elements disposed on the object side of the reflecting surface.

8. An imaging device as claimed in claim 1, wherein the zoom lens system has not more than one lens element disposed on the object side of the reflecting surface.

9. An imaging device as claimed in claim 8, wherein the following condition is fulfilled:

$$-11.0 < fa/fw < -2.5 \qquad (3)$$

here fa represents a focal length of one lens element disposed on the object side of the reflecting surface; and fw represents a focal length of the entire zoom lens system in a wide angle condition.

10. An imaging device as claimed in claim 9, wherein the following condition is fulfilled:

$$-5.0 < fa/fw < -3.0 \qquad (3)'$$

11. An imaging device as claimed in claim 1, wherein the following condition is fulfilled:

$$3.0 < fl/fw < 7.0 \qquad (4)$$

here fl represents a focal length of the first lens unit; and fw represents a focal length of the entire zoom lens system in a wide angle condition.

12. An imaging device comprising:

a zoom lens system comprising a plurality of lens units and forming an optical image of an object so as to be continuously and optically zoomable by varying a distance between the lens units; and an image sensing element converting the optical image formed by the zoom lens system into an electric signal, wherein the zoom lens system comprises from the object side:

a first lens unit having positive optical power as a whole and including a right-angle prism having an internal reflecting surface that bends a luminous flux substantially 90 degrees;

a second lens unit having negative optical power and disposed with a variable air space from the first lens unit;

a third lens unit having positive optical power and disposed with a variable air space from the second lens unit; and a fourth lens unit having positive optical power and disposed with a variable air space from the third lens unit, and wherein zooming is optically performed by varying the air spaces between the lens units, and wherein the following condition is satisfied:

$$Np \geq 1.8$$

where Np is a refractive index to a d-line of the right-angle prism.

13. An imaging device as claimed in claim 12, wherein the following condition is fulfilled:

$$1.0 < D/fw < 2.6 \qquad (2)$$

here

D represents an axial distance between surface at the most object side surface of the first lens unit and reflection surface; and fw represents a focal length of the entire zoom lens system in a wide angle condition.

14. An imaging device as claimed in claim 13, wherein the zoom lens system has not more than two elements disposed on the object side of the reflecting surface.

15. An imaging device as claimed in claim 13, wherein the zoom lens system has not more than one lens element disposed on the object side of the reflecting surface.

16. An imaging device as claimed in claim 15, wherein the following condition is fulfilled:

$$-11.0 < fa/fw < -2.5 \qquad (3)$$

here fa represents a focal length of one lens element disposed on the object side of the reflecting surface; and fw represents a focal length of the entire zoom lens system in a wide angle condition.

17. An imaging device as claimed in claim 16, wherein the following condition is fulfilled:

$$-5.0 < fa/fw < -3.0 \qquad (3)'$$

18. An imaging device as claimed in claim 12, wherein the following condition is fulfilled:

$$3.0 < fl/fw < 7.0 \qquad (4)$$

here fl represents a focal length of the first lens unit; and fw represents a focal length of the entire zoom lens system in a wide angle condition.

19. A digital camera comprising:

an imaging device having a zoom lens system comprising a plurality of lens units and forming an optical image of an object so as to be continuously and optically zoomable by varying a distance between the lens units; and an image sensing element converting the optical image formed by the zoom lens system into an electric signal, wherein the zoom lens system comprises from the object side:

a first lens unit having positive optical power as a whole and including a reflecting surface that bends a luminous flux substantially 90 degrees;

a second lens unit having negative optical power and disposed with a variable air space from the first lens unit;

a third lens unit having positive optical power and disposed with a variable air space from the second lens unit;

a fourth lens unit having positive optical power and disposed with a variable air space from the third lens unit; and a fifth lens unit disposed with a variable air space from the fourth lens unit, and wherein zooming is optically performed by varying the air spaces between the lens units.

20. A digital camera as claimed in claim 19, wherein the first lens unit includes a right-angle prism having an internal reflecting surface as the reflecting surface.

21. A digital camera as claimed in claim 20, wherein the following condition is satisfied:

$$Np \geq 1.8$$

where Np is a refractive index to a d-line of the right-angle prism.

22. A digital camera as claimed in claim 19, wherein the fifth lens unit has a positive optical power.

23. A digital camera as claimed in claim 19, wherein the fifth lens unit has a negative optical power.

24. A digital camera as claimed in claim 19, wherein the following condition is fulfilled:

$$1.0 < D/fw < 2.6 \qquad (2)$$

here

D represents an axial distance between surface at the most object side surface of the first lens unit and reflection surface; and fw represents a focal length of the entire zoom lens system in a wide angle condition.

25. A digital camera as claimed in claim 19, wherein the zoom lens system has not more than two elements disposed on the object side of the reflecting surface.

26. An digital camera as claimed in claim 19, wherein the zoom lens system has not more than one lens element disposed on the object side of the reflecting surface.

27. A digital camera comprising:

an imaging device having a zoom lens system comprising a plurality of lens units and forming an optical image of an object so as to be continuously and optically zoomable by varying a distance between the lens units; and an image sensing element converting the optical image formed by the zoom lens system into an electric signal, wherein the zoom lens system comprises from the object side:

a first lens unit having positive optical power as a whole and including a right-angle prism having an internal reflecting surface that bends a luminous flux substantially 90 degrees;

a second lens unit having negative optical power and disposed with a variable air space from the first lens unit;

a third lens unit having positive optical power and disposed with a variable air space from the second lens unit; and a fourth lens unit having positive optical power and disposed with a variable air space from the third lens unit, and wherein zooming is optically performed by varying the air spaces between the lens units, and wherein the following condition is satisfied:

$$Np \geq 1.8$$

where Np is a refractive index to a d-line of the right-angle prism.

28. A digital camera as claimed in claim 27, wherein the following condition is fulfilled:

$$1.0 < D/fw < 2.6 \qquad (2)$$

here

D represents an axial distance between surface at the most object side surface of the first lens unit and reflection surface; and fw represents a focal length of the entire zoom lens system in a wide angle condition.

29. A digital camera as claimed in claim 28, wherein the zoom lens system has not more than two elements disposed on the object side of the reflecting surface.

30. A digital camera as claimed in claim 28, wherein the zoom lens system has not more than one lens element disposed on the object side of the reflecting surface.

* * * * *

UNITED STATES PATENT AND TRADEMARK OFFICE
CERTIFICATE OF CORRECTION

PATENT NO. : 6,754,446 B2
DATED : June 22, 2004
INVENTOR(S) : Hitoshi Hagimori et al.

It is certified that error appears in the above-identified patent and that said Letters Patent is hereby corrected as shown below:

Column 12,
Line 22, delete "r11* = 10.345" and insert -- r11* = -10.345 --.

Column 13,
Line 19, delete "r9* = -18 458", and insert -- r9* = -18.458 --.

Column 16,
Line 23, delete "r13* = 19.820", and insert -- r13* = -19.820 --.

Column 18,
Line 32, delete "r20* = 11.415", and insert -- r20* = -11.415 --.

Signed and Sealed this

Seventh Day of December, 2004

JON W. DUDAS
*Director of the United States Patent and Trademark Office*